United States Patent
Izawa et al.

(10) Patent No.: US 6,397,613 B1
(45) Date of Patent: Jun. 4, 2002

(54) REFRIGERATING CYCLE APPARATUS

(75) Inventors: Satoshi Izawa, Kariya; Yoshiaki Takano, Kosai; Hajime Ito, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/590,040

(22) Filed: Jun. 8, 2000

(30) Foreign Application Priority Data

Jun. 25, 1999 (JP) ............................................. 11-180456
Nov. 10, 1999 (JP) ............................................. 11-320188

(51) Int. Cl.⁷ ............................ F25B 41/00; F25B 49/00
(52) U.S. Cl. ........................................ 62/196.4; 62/149
(58) Field of Search ........................... 62/174, 126, 149, 62/196.4; 165/29

(56) References Cited

U.S. PATENT DOCUMENTS

| | | | | |
|---|---|---|---|---|
| 4,602,485 A | * | 7/1986 | Fujimoto et al. | ............. 62/174 |
| 4,858,443 A | * | 8/1989 | Denpou | ....................... 62/126 |
| 5,067,556 A | * | 11/1991 | Fudono et al. | ................ 165/29 |
| 5,174,365 A | * | 12/1992 | Noguchi et al. | .............. 165/29 |
| 5,291,941 A | | 3/1994 | Enomoto et al. | |
| 6,105,375 A | * | 8/2000 | Takano et al. | ................ 62/149 |
| 6,244,060 B1 | * | 6/2001 | Takano et al. | ............. 62/196.4 |

* cited by examiner

*Primary Examiner*—Teresa Walberg
*Assistant Examiner*—Leonid M Fastovsky
(74) *Attorney, Agent, or Firm*—Harness, Dickey & Pierce, PLC

(57) ABSTRACT

A refrigerating cycle apparatus is used in an air-conditioning system of an automotive vehicle, which is capable of operating in a hot gas bypass heating mode. Here, the discharge side of a compressor is directly connected through a hot gas bypass conduit to the inlet side of an evaporator. The evaporator acts as a radiator, heated by gas refrigerant. The compressor is stopped during operation of the apparatus in this heating mode when a physical quantity representing the high-side pressure at the compressor discharge side rises above a set value. The compressor is restarted when a physical quantity representing a heating capacity (for example the high-side pressure) falls below a set value which indicates that there is no heating capacity in the stopped state of the compressor. As a result, the heating capacity obtained through hot gas bypass can be controlled well without frequent stopping and restarting of the compressor.

13 Claims, 16 Drawing Sheets

REFRIGERATING CYCLE APPARATUS

CROSS-REFERENCE TO RELATED APPLICATION

The present invention is related to Japanese patent application No. Hei. 11-180456, filed Jun. 25, 1999; No. Hei. 11-320188, filed Nov. 10, 1999; the contents of which are incorporated herein by reference.

FIELD OF THE INVENTION

The present invention relates to a refrigerating cycle apparatus, and more particularly, to a refrigerating cycle apparatus having a hot gas bypass function.

BACKGROUND OF THE INVENTION

Generally, in vehicle air-conditioning systems, during winter heating, warm water (engine cooling water) is circulated through a heat exchanger for heating. Air-conditioning air is heated by this heat exchanger by using the warm water as a heat source. However, in this case, when the temperature of the warm water is low, the temperature of air blown into the passenger compartment of the vehicle is low, and the required heating effect is not obtained.

In an attempt to overcome this problem, Japanese Unexamined Patent Publication No. H.5-223357 proposes a refrigerating cycle apparatus capable of realizing a heating function by using hot gas bypass has been proposed. In this apparatus, when the warm water temperature is lower than a predetermined temperature, such as during engine starting, an auxiliary heating function is provided by feeding gas refrigerant delivered by a compressor (hot gas) into an evaporator. This approach bypasses the condenser, and heat from the gas refrigerant is transferred by the evaporator into the air-conditioning air. That is, the same heat exchanger mounted in an air-conditioning case, namely the evaporator, is used alternately to cool in a cooling mode and to heat during a heating mode.

Now, in the above described apparatus, during a heating mode, a high-side pressure is sensed at the discharge side of the compressor. When this pressure falls below a set value, the compressor is operated. However, when this pressure rises above the set value, compressor operation is stopped to prevent an abnormal rise in the high-side pressure.

While this apparatus has benefits, it provides no specific method for deciding the set value of the high-side pressure at which to stop compressor operation. However, experimental studies, carried out by the present inventors, show an operational problem with the compressor being stopped and restarted frequently during an extremely small period of time. More specifically, when in the hot gas bypass heating mode, the capacity of the high-pressure circuit part of the cycle is much lower than in the cooling mode. This is because high-pressure refrigerant from the compressor discharge side is fed directly to the evaporator, bypassing the condenser. Also, the hot gas bypass heating mode is used during cold temperatures when the outside air temperature is about −10° C. Thus, there is much heat transfer from the high-pressure refrigerant to the low-temperature outside air. Consequently, when the operation of the compressor is stopped, the high-side pressure falls in an extremely short time to a value close to the low-side pressure.

As a result, the time period that the compressor operation stops and restarts is very short. And as a result, the life of an electromagnetic clutch controlling the compressor is shortened and the frequent stopping and restarting of the compressor (shock) reduces ride comfort. The present invention was developed in light of these drawbacks.

SUMMARY OF THE INVENTION

It is therefore an object of the present invention to control heating capacity obtained by hot gas bypass system without giving rise to frequent stopping and restarting of a compressor.

It is another object of the present invention to control heating capacity obtained by hot gas bypass system without stopping and restarting of a compressor causing switching of refrigerant conduits.

Accordingly, the objects of the present invention are accomplished by providing a refrigerating cycle apparatus capable of being operated in a hot gas bypass heating mode, wherein by the discharge side of a compressor is directly connected through a hot gas bypass conduit to the inlet side of an evaporator (18). The evaporator acts as a radiator heated by gas refrigerant. The invention comprises a stop control means (S180, S200) which stops the compressor when, during a heating mode, the high-side pressure at the compressor discharge side rises above a set value. An operation restart control means is provided for restarting the compressor when, while the compressor is stopped, a heating capacity falls below a set value which indicates that there is no heating capacity.

When the compressor is temporarily stopped, It is maintained in an off condition until the heating capacity falls below a set value indicating that there is no heating capacity. Consequently, the compressor is not restarted within a short time, it is possible to prevent problems such as decreasing the life of an electromagnetic clutch by frequent stopping and restarting.

Furthermore, after the compressor is stopped, there is a temperature difference between the temperature of the evaporator surface and the air passing over it. This difference is due to the heat capacity of the evaporator and remains until the heating capacity falls below a set value indicating that there is no heating capacity. However, in the present invention, the compressor can be restarted while this temperature difference remains. Therefore, the heating capacity does not fall too far due to the compressor being stopped for a long period of time. Thus, in the on/off-control of the compressor, the heating capacity is accurately controlled while problems, such as shortened life of the electromagnetic clutch, are prevented.

In another aspect of the present invention, a refrigerating cycle apparatus having a hot gas bypass conduit directly connecting the discharge side of a compressor to the inlet side of an evaporator is provided. The apparatus has a valve means for switching the connection between the discharge side of the compressor and the hot gas bypass conduit. The apparatus also has a connection between the discharge side of the compressor and a condenser and is capable of operating in a hot gas bypass heating mode.

The discharge side of the compressor is directly connected through the valve means and the hot gas bypass conduit to the inlet side of the evaporator. As such, the evaporator is made to act as a radiator, which is heated by gas refrigerant. The apparatus generally comprises a first control means for controlling the valve means that refrigerant flows to the condenser side when, in the heating mode, a high-side pressure at the compressor discharge side rises above a set value. A second control means for restoring the valve means to a heating mode operation state thereof when a heating capacity in the evaporator falls below a set value which indicates there is no heating capacity.

As such, the heating capacity, obtained during hot gas bypass by refrigerant flow control using the valve means, can be accurately controlled. Thus, heating capacity control can be carried out by switching of refrigerant conduits without stopping and restarting the compressor, and fluctuations of compressor torque can be suppressed.

As provided in another aspect of the present invention, the first control means controls the valve means so that the connection between the discharge side of the compressor and the hot gas bypass conduit and the connection between the discharge side of the compressor and the condenser are both open. By this means, it is possible to carry out heating capacity control with refrigerant flowing to the hot gas bypass conduit side and to the condenser side in parallel.

In another aspect of the present invention, the first control means controls the valve means to close the connection between the discharge side of the compressor and the hot gas bypass conduit and open the connection between the discharge side of the compressor and the condenser. As a result, heating capacity control is carried out with the same state as during the cooling mode of the apparatus. In another aspect of the invention, at least one or the other of the set values pertaining to the high-side pressure and the heating capacity are corrected based on heat load. As a result, in on/off-control of the compressor, because the compressor operating time is corrected according, to heat load, on/off-control of the compressor can be controlled appropriately corresponding to heat load.

In another aspect of the present invention, a quantity relating to heat load is an outside air temperature or the temperature of a room being heated. As provided in a further aspect of the present invention, an apparatus having a warm water type heat exchanger for heating is provided. This device constitutes the main heating device and is disposed on the air downstream side of the evaporator. A quantity representing the heating load is the temperature of warm water circulating through the heat exchanger or the outlet temperature of air blown into a room through an outlet downstream of the heat exchanger.

As set forth in a further aspect of the present invention, a quantity representing the heating capacity is the refrigerant pressure in the cycle during compressor stoppage. Here, either the high-side pressure or the low-side pressure can be used as the refrigerant pressure in the cycle.

In another aspect of the present invention, the quantity representing the heating capacity is the refrigerant pressure in the cycle during a compressor stoppage. When as a result of the stoppage of the compressor the refrigerant pressure falls to the vicinity of a saturation pressure with respect to the outside air temperature the compressor is restarted.

When the compressor is stopped, high side pressure falls more rapidly and the rate of heat transfer from the high-pressure refrigerant to the outside air increases as the outside air temperature drops. However, because the saturation pressure of the outside air temperature also falls with outside air temperature, in this aspect of the present invention, the refrigerant pressure at which the compressor is restarted becomes low when the outside air temperature is low. As a result, because the refrigerant pressure at which the compressor is restarted becomes low and the high-side pressure falls more rapidly, these conditions may cancel each other out. Therefore, the time that compressor is stopped is prevented from becoming short when the outside air temperature is low. Therefore, the time that compressor is stopped is kept substantially constant, irrespective of changes in the outside air temperature.

In another aspect of the present invention, the quantity representing the heating capacity is the temperature of evaporator. As set forth in an eleventh aspect of the present invention, the quantity representing the heating capacity is the temperature of evaporator. Also, the compressor is restarted when the temperature of the evaporator has fallen to a temperature of about the outside air temperature due to stopping operation of compressor.

In another aspect of the present invention, a refrigerating cycle apparatus capable of being operated in a hot gas bypass heating mode, wherein by the discharge side of a compressor is directly connected through a hot gas bypass conduit to the inlet side of an evaporator. The evaporator acts as a radiator heated by gas refrigerant. The invention comprises a stop control means which stops the compressor when, during a heating mode, the high-side pressure at the compressor discharge side rises above a set value. An operation restart control means for restarting the compressor when the time for which the compressor has been stopped reaches a set value.

As a result, the compressor is restarted after it has been forcibly stopped for a set time pertaining to the operation restart control means. As such, the time which the compressor is stopped can easily be kept constant irrespective of changes in usage conditions.

Further areas of applicability of the present invention will become apparent from the detailed description provided hereinafter. It should be understood that the detailed description and specific examples, while indicating preferred embodiments of the invention, are intended for purposes of illustration only, since various changes and modifications within he spirit and scope of the invention will become apparent to hose skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
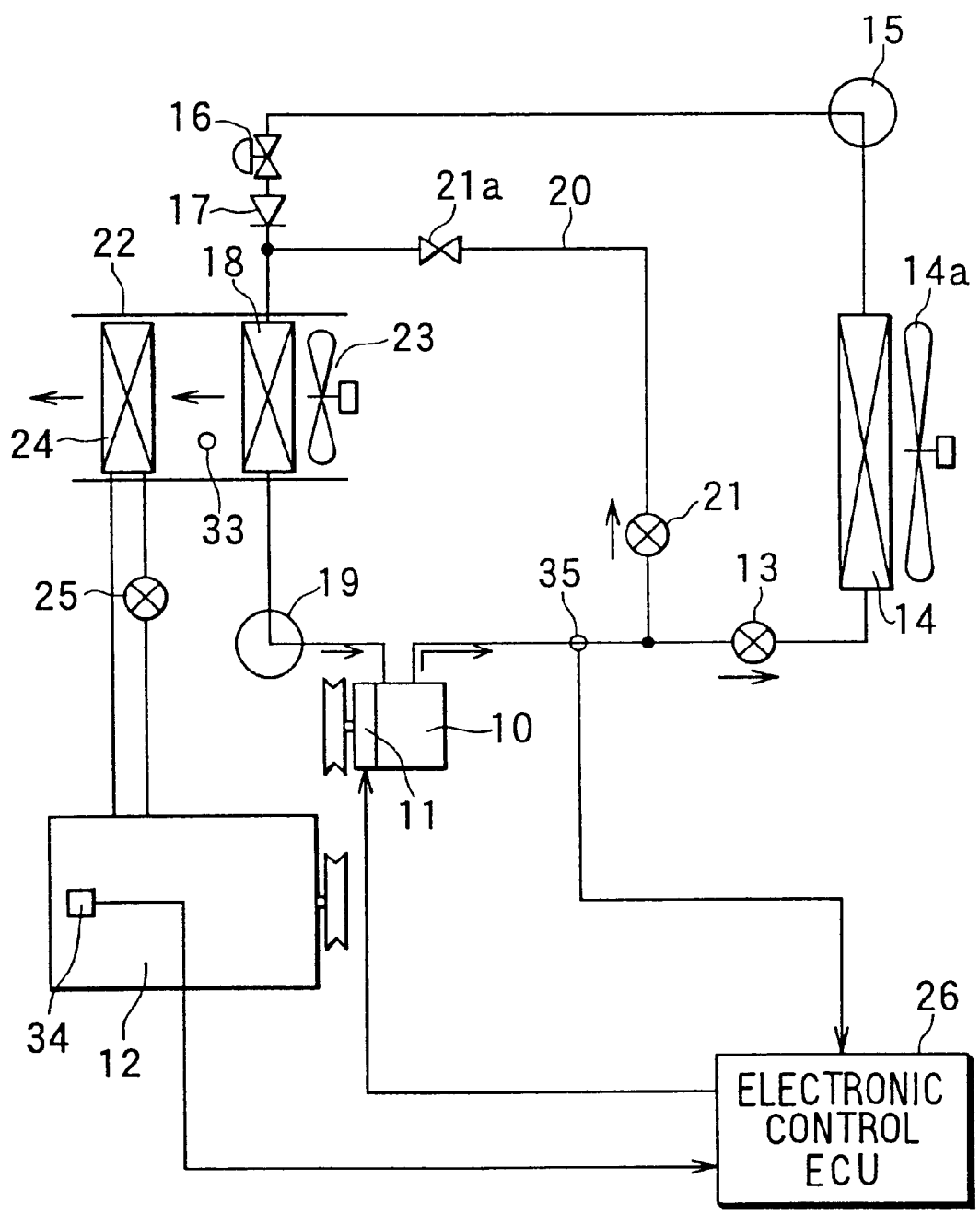
FIG. 1 is schematic view of a first embodiment of a refrigerating cycle apparatus according to the present invention.

FIG. 1 shows a first preferred embodiment of a refrigerating cycle apparatus of an air-conditioning system for use in an automotive vehicle. Here, a compressor 10 is driven by a water-cooled vehicle engine 12 via an electromagnetic clutch 11. The compressor 10, for example, is a fixed-capacity swashplate type compressor.

The discharge side of the compressor 10 is connected via an electromagnetic valve for cooling (first valve means) 13 to a condenser 14. The outlet side of condenser 14 is connected to a liquid-receiver 15 for separating gas and liquid phases of a refrigerant and collecting liquid refrigerant. Cooling air (outside air) is blown through the condenser 14 by an electric cooling fan 14a.

The outlet side of the liquid-receiver 15 is connected to a temperature-controlled expansion valve (first pressure-reducing means) 16. The outlet side 6f the temperature-controlled expansion valve 16 is connected via a check valve 17 to an evaporator 18. The outlet side of the evaporator 18 is connected via an accumulator 19 to the intake side of the compressor 10. The temperature-controlled expansion valve 16 adjusts its valve aperture (refrigerant flow) so as to keep the degree of superheating of refrigerant at the outlet side of the evaporator 18 at a predetermined value during ordinary refrigerating cycle operation (in a cooling mode). The accumulator 19 separates gas and liquid phases of a refrigerant and collects the liquid refrigerant. The accumulator 19 allows the gas refrigerant and a small amount of liquid refrigerant (in which oil is dissolved) near the bottom to be taken into the intake side of compressor 10.

A hot gas bypass conduit 20 is provided between the discharge side of the compressor 10 and the inlet side of the evaporator 18, bypassing the condenser 14. An electromagnetic valve for heating (second valve means) 21 and a throttle (second pressure-reducing means) 21a are provided in series in hot gas bypass conduit 20. Throttle 21a can be a fixed throttle such as an orifice or a capillary tube.

The evaporator 18 is mounted inside an air-conditioning case 22 of a vehicle air-conditioning system and exchanges heat with air (air from inside a passenger compartment of the vehicle, or outside air) blown therethrough by an electric air-conditioning blower 23. In a cooling mode, refrigerant inside the evaporator 18 cools this air by absorbing heat therefrom and evaporating. Also, in a heating mode, the evaporator 18 takes in high-temperature refrigerant gas (hot gas) from the hot gas bypass conduit 20 and transfers heat therefrom into the air, thus performing the role of a radiator.

Inside air-conditioning case 22, a warm water type heat exchanger 24 is disposed on the air downstream side of the evaporator 18. Warm water type heat exchanger 24 heats air blown therethrough with warm water (engine cooling water) from the vehicle engine 12. This air is then blown as air-conditioning air into the passenger compartment through outlets (not shown) provided on the downstream side of heat exchanger 24. A warm water valve 25, which controls warm water flow to heat exchanger 24, is provided in a warm water circuit which serves heat exchanger 24. In the heating mode, the evaporator 18 constitutes an auxiliary heating device and the warm water type heat exchanger 24 constitutes a main heating device.

An air-conditioning electronic control unit (hereinafter, ECU) 26 includes a microcomputer and peripheral circuits. ECU 26 carries out computational processing of input signals according to programs to control the operation of the electromagnetic clutch 11, the electromagnetic valves 13, 21 and other electric devices (14a, 23, 25 and so on).

Figure 2:
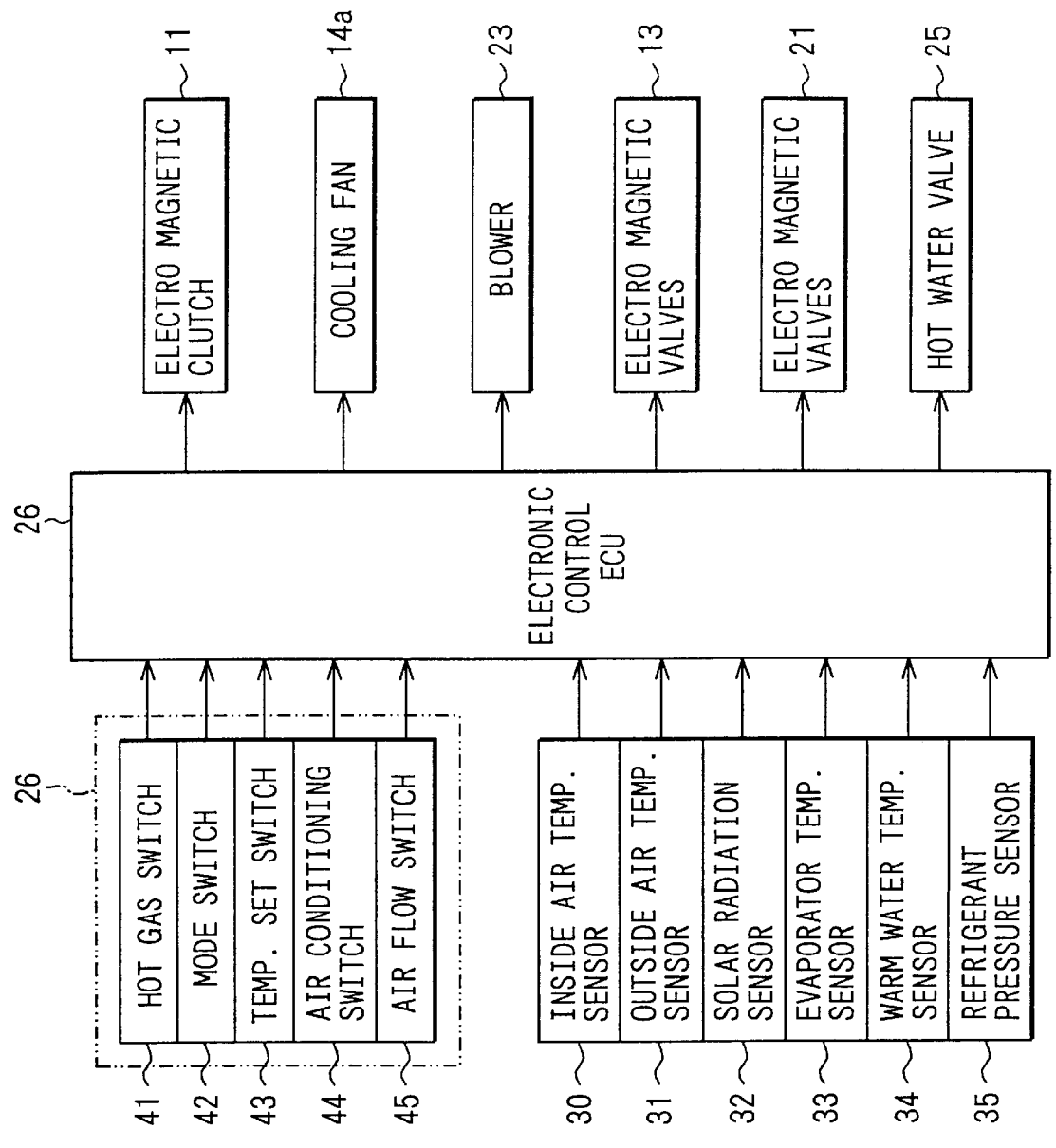
FIG. 2 is a block diagram of an electric control for a first embodiment of a refrigerating cycle apparatus according to the present invention.

Referring now to FIG. 2, a block diagram of an electric control, including ECU 26, is shown and described. Detection signals from a set of sensors including an inside air temperature sensor 30, which detects the air temperature inside the passenger compartment; outside air temperature sensor 31, which detects the outside air temperature; solar radiation sensor 32, which detects the amount of solar radiation entering the passenger compartment; a temperature sensor 33 for evaporator 18; a warm water temperature sensor 34 for the vehicle engine 12; and a refrigerant pressure sensor 35. Outputs from each of these sensors are inputted to ECU 26.

Here, the temperature sensor 33 of the evaporator 18 is disposed in a position immediately behind the exit of the evaporator 18, as shown in FIG. 1. Temperature sensor 33 detects an exit air temperature from the evaporator 18. The refrigerant pressure sensor 35 is disposed on the discharge side of the compressor 10 as shown in FIG. 1. Refrigerant pressure sensor 35 detects the high-side pressure Pd at the discharge side of the compressor 10.

Control signals from a set of control switches 41 through 45 in an air-conditioning control panel 40 mounted in the vicinity of a dashboard in the passenger compartment, are also input into ECU 26. These control switches include a hot gas switch (auxiliary heating switch) 41, which outputs a hot gas bypass heating mode operation signal; a mode switch 42 for switching among air-conditioning outlet modes (FACE, BI-LEVEL, FOOT, DEFROSTER); a temperature setting switch 43, which outputs a signal for setting the passenger compartment temperature; an air-conditioning switch 44, which outputs a cooling mode operation signal; and an airflow switch 45 which controls the power of the blower 23.

The operation of this preferred embodiment will now be described. First, the operation of the refrigerating cycle will be explained. When the air-conditioning switch 44 is turned on and outputs a cooling mode operation signal, the ECU 26 opens the electromagnetic valve 13, closes the electromagnetic valve 21 and engages the electromagnetic clutch 11 so that compressor 10 is driven by the vehicle engine 12.

As a result, gas refrigerant, delivered by the compressor 10, flows through the electromagnetic valve 13 and into the condenser 14. Here, the refrigerant is cooled and is condensed. The condensed liquid refrigerant then undergoes gas/liquid separation in the liquid-receiver 15. Then, liquid refrigerant only is reduced in pressure and thereby brought to a low temperature, low pressure gas/liquid two-phase state by the temperature-controlled expansion valve 16.

The low-pressure refrigerant then flows through the check valve 17 into the evaporator 18 and removes heat from air-conditioning air delivered by the blower 23 and then evaporates. Air-conditioning air, cooled by the evaporator 18, then blows into the passenger compartment and cools the passenger compartment. Gas refrigerant evaporated in the evaporator 18 is taken in to the compressor 10 through the accumulator 19 and compressed.

In winter, on the other hand, the hot gas switch 41 is turned on and outputs a heating mode operation signal. The ECU 26 closes the electromagnetic valve 13 and opens the electromagnetic valve 21 so that the hot gas bypass conduit 20 is opened. As a result, The heating mode is set.

Consequently, when the electromagnetic clutch 11 engages and the compressor 10 is driven by the vehicle engine 12, high-temperature gas refrigerant (superheated gas refrigerant) delivered from the compressor 10 passes through the electromagnetic valve 21, which is in an open state. The gas pressure is reduced by the throttle 21a, and it flows into the evaporator 18. During this time, check valve 17 prevents gas refrigerant from the hot gas bypass conduit 20 from flowing to the temperature-controlled expansion valve 16 side.

Superheated gas refrigerant, reduced in pressure by the throttle 21a, transfers heat to air in the evaporator 18. Here, the amount of heat released from the gas refrigerant in the evaporator 18 is equivalent to the amount of compression work done by the compressor 10. At this time, if the warm water temperature of the vehicle engine 12 is high enough, the air can be further heated in heat exchanger 24 before being blown as warm air-conditioning draft into the passenger compartment. This heating is accomplished by feeding warm water through the warm water valve 25 to the warm water type heat exchanger 24.

Gas refrigerant, having given off heat in the evaporator 18, is drawn into compressor 10 via accumulator 19 and compressed. During winter heating, to prevent fogging of window glass, outside air is normally taken in and blown into air-conditioning case 22.

Figure 3:
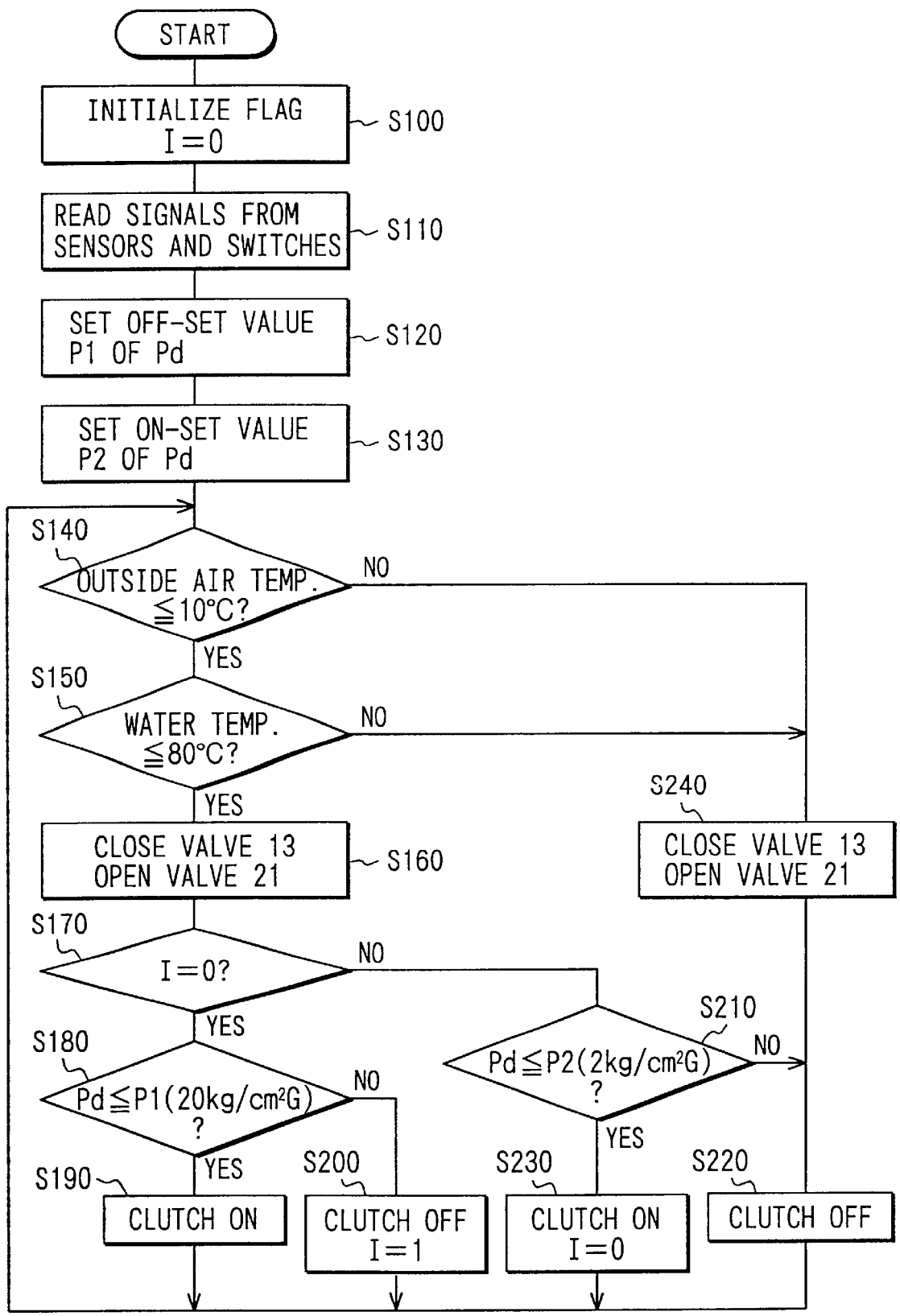
FIG. 3 is a flow chart depicting a heating mode for a first embodiment of a refrigerating cycle apparatus according to the present invention.

Next, hot gas bypass heating mode capacity control during low outside air temperature in winter will be discussed in detail. As shown in FIG. 3, the control routine starts when an ignition switch (not shown) of vehicle engine 12 has been turned on and the hot gas switch 41 on the air-conditioning control panel 40 is turned on. Also, in a step S100, initialization of flag I=0 is carried out. Then, in step S110, signals from the sensors 30 through 35 and the control switches 41 through 45 of the air-conditioning control panel 40 are read in.

Then, in step S120, an OFF-set value P1 of the high-side pressure Pd is determined. Here, the OFF-set value P1 is a set value at which the electromagnetic clutch 11 is to be disengaged and the compressor 10 thereby stopped. In this example, P1 is made a preset fixed value, for example 20 kg/cm$^2$G.

Then, in step S130, an ON-set value P2 of the high-side pressured Pd is set. Here, the ON-set value P2 is a set value at which the electromagnetic clutch 11 is engaged and the compressor 10 is thereby restarted after the compressor 10 is stopped. In this example, the set value is determined based on the saturation chart of refrigerant R134a shown in FIG. 4. That is, the ON-set value P2 is set to a pressure slightly (about 1 kg/cm$^2$G) higher than the saturation pressure P0 of refrigerant R134a at the outside air temperature. Accordingly, the ON-set value P2 is a value which falls with the outside air temperature.

Here, the determined ON-set value P2 is a value held in the air-conditioning ECU 26. This held value of P2 can also be used to detect a refrigerant shortage, when a detected pressure is smaller than P2. Here, the high-side pressure P2, representing the heating capacity, and the refrigerant shortage detection value are the same. That is, the same area of memory inside the ECU 26 can be used for both purposes, thereby making it possible to save memory and simplify circuit construction.

Then in step S140, it is determined whether the outside air temperature is below a set value (for example 10° C.). If true, step S150 determines whether the engine water temperature is below a set value (for example 80° C.).

When the outside air temperature and the engine water temperature are both below their respective set values, the hot gas bypass heating mode operation is necessary. As such, in step S160, the electromagnetic valve 13 for cooling is closed and the electromagnetic valve 21 for heating is opened and the hot gas bypass heating mode is thereby set.

Then, in step S170, it is determined whether flag I=0. If this is the first time this determination has been made since the hot gas switch 41 was turned on, processing proceeds to step S180 because flag I=0. As such, step s180 determines whether the high-side pressure Pd of the compressor 10 is below the OFF-set value P1 (for example 20 kg/cm$^2$G). If the high-side pressure Pd is below the Off-set value P1, processing proceeds to step S190 and the electromagnetic clutch 11 is engaged (turned ON) and the compressor 10 is thereby operated.

As compressor 10 continues operating, the high-side pressure Pd rises above the Off-set value P1. Processing then proceeds from step S180 to step S200 and disengages (turns OFF) the electromagnetic clutch 11, thereby stopping the compressor 10 and updating flag I to flag I=1.

As a result, when step S170 is next reached, the answer is NO. As a result, processing proceeds to step S210 and determines whether the high-side pressure Pd of the compressor 10 is below the ON-set value P2 (for example, when the outside air temperature=−10° C., 2 kg/cm$^2$G). When the high-side pressure Pd is higher than the ON-set value P2, processing proceeds to step S220 and electromagnetic clutch 11 is kept disengaged (OFF), thereby keeping the compressor 10 off.

While compressor 10 remains stopped, the high-side pressure Pd falls below the ON-set value P2. Processing then proceeds from step S210 to step S230 and engages (turns ON) the electromagnetic clutch 11, thereby restarting the compressor 10. Flag I is updated to flag I=0.

Accordingly, in steps S190, S200, S220 and S230, operation of the compressor 10 is on/off-controlled and hot gas bypass heating capacity is thereby controlled. When the outside air temperature is higher than the respective above-mentioned set value (for example 10° C.), and when the engine water temperature is higher than the respective above-mentioned set value (for example 80° C.), hot gas bypass heating is not necessary. As such, processing proceeds from step S140 or step S150 to step S240, thereby closing both electromagnetic valves for cooling 13 and the electromagnetic valve for heating 21. This is done before proceeding to step S220 and disengaging (turning OFF) the electromagnetic clutch 11 to stop compressor 10. Accordingly, hot gas bypass heating mode operation is automatically stopped and wasting power for driving the compressor 10 is prevented.

Figure 5:
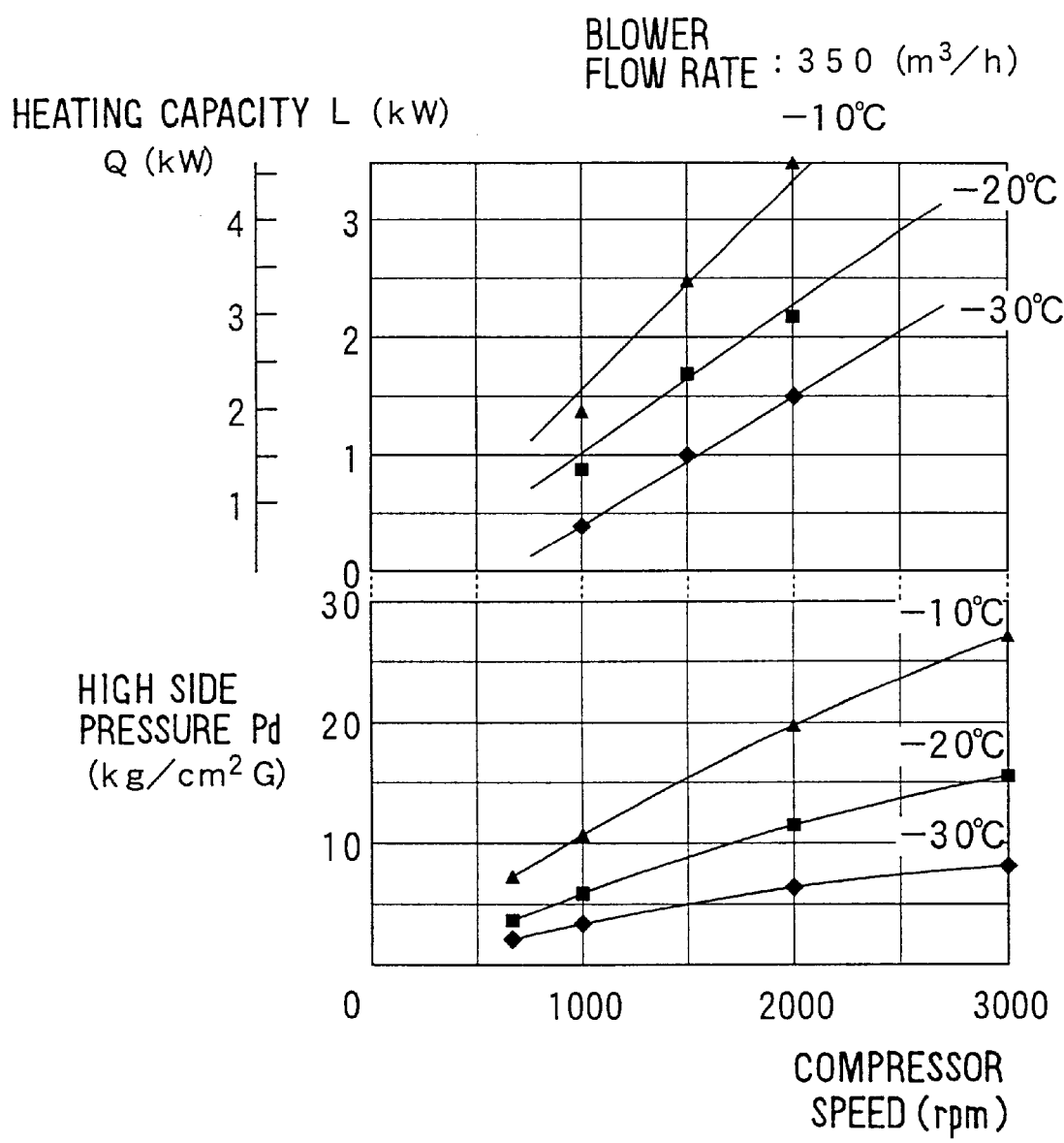
FIG. 5 is a graphical view of the relationship between heating capacity and outside air temperature for a refrigerating cycle apparatus according to the present invention.

Next, the technological significance of the on/off-control of the compressor 10 (that is, hot gas bypass heating capacity control) as described above will be explained. FIG. 5 is a graph showing experimental results obtained by the present inventors. FIG. 5 also shows the relationship between the compressor speed and the heating capacity Q, the compressor drive power L and the high-side pressure (discharge pressure) Pd, with the outside air temperature as a parameter.

As can be understood from FIG. 5, in the hot gas bypass heating mode, as the outside air temperature rises and the heating load decreases, the compressor speed rises and the compressor discharge flow increases. Also, as outside air temperature rises and heating load decreases, high-side pressure Pd rises and heating capacity Q increases. Because the heating capacity Q and the compressor drive power L are proportional, compressor drive power L has the same relationship with the compressor speed and the outside air temperature as with the heating capacity Q.

Here, the rising of high-side pressure Pd and heating capacity Q hastens the rising of engine cooling water temperature which circulates through the heat exchanger 24 for heating. This causes the engine load to increase due to the compressor drive power L increasing, which is desirable. However, the compressor drive power L may rise further than when in cooling mode, having an adverse effect on the life of the electromagnetic clutch 11. Or, the high-side pressure Pd may exceed the pressure that the refrigerating cycle can withstand.

To avoid this, in this first preferred embodiment, when the high-side pressure Pd reaches the Off-set value P1 (for example 20 kg/cm$^2$G), the compressor 10 is stopped. As a result, the high-side pressure Pd is prevented from rising above the Off-set value P1. However, since making this Off-set value P1 low leads to heating capacity Q being low, to obtain necessary heating capacity, the Off-set value P1 is preferably set to at least 14 kg/cm$^2$G.

Figure 6:
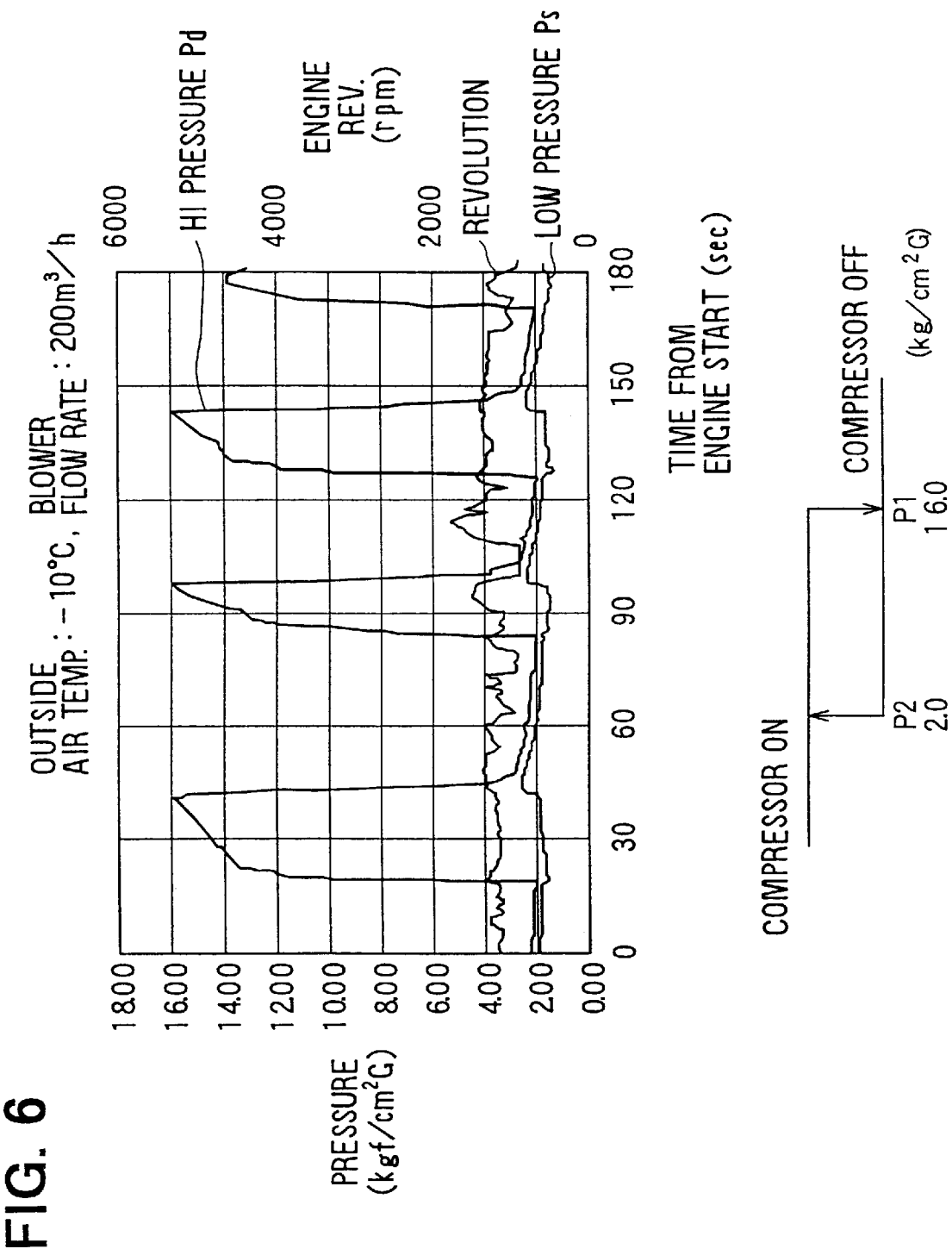
FIG. 6 is a graphical view of a compressor control for a refrigerating cycle apparatus according to the present invention.

Next, a method for determining the ON-set value P2 at which the compressor 10 is restarted will be described. FIG. 6 shows changes in the high-side pressure Pd and the low-side pressure Ps accompanying on/off-control of the compressor 10. FIG. 6 specifically shows results obtained when the compressor 10 was on/off-controlled with the Off-set value P1 made 16 kg/cm$^2$G and the ON-set value P2 made 2 kg/cm$^2$G, as shown in the lower part of FIG. 6, and with an outside air temperature of −10° C. For reference, the engine speed is also shown in FIG. 6.

When the high-side pressure Pd rises above the Off-set value P1 and the compressor 10 is stopped, the high-side pressure Pd falls in an extremely short time to a value in the vicinity of the low-side pressure Ps, as shown in FIG. 6. This is because the capacity of the high-pressure circuit part of the cycle is much smaller in the hot gas bypass heating mode than in the cooling mode. Furthermore, under the low temperature condition of outside air temperature=−10° C., the rate of heat transfer from the high pressure refrigerant to the outside air is high.

In the hot gas bypass heating mode, the high-side pressure Pd falls rapidly when the compressor 10 is stopped. The stopped state of the compressor 10 is maintained until the high-side pressure Pd falls to a level at which there is no heating capacity. Only when the high-side pressure Pd falls to this level, the compressor 10 is restarted.

The high-side pressure Pd level where there is no heating capacity is now explained in greater detail. When the high-side pressure Pd falls to approximately the saturation pressure P0 (the pressure on the saturation line of FIG. 4) for the outside air temperature, the temperature difference between the surface of the evaporator 18 and the air (outside air) blown their through is zero, thereby ceasing any heating capacity. This is because the refrigerant temperature of the evaporator 18 equals the temperature of the outside air temperature, Since there is a large pressure difference between the high-side pressure Pd when the compressor 10 is operating and the saturation pressure P0 for the outside air temperature. Also, the high-side pressure Pd falls gently after the high-side pressure Pd has fallen to approximately the low-side pressure Ps. Therefore, it takes some time for the high-side pressure Pd to fall to approximately the saturation pressure P0 for the outside air temperature.

Therefore, by setting the ON-set value P2 to approximately the saturation pressure P0 for the outside air temperature (in this first preferred embodiment P2 is a pressure slightly higher than P0), the stopped state of the compressor 10 can be continued in on/off-control for a predetermined time of about 20 to 30 seconds. And, because the compressor operation stopping and restarting period is kept from becoming extremely short, the life of the electromagnetic clutch 11 is not shortened by frequent stopping and restarting of the compressor.

Moreover, by setting the ON-set value P2 to a pressure slightly higher than the saturation pressure P0 for the outside air temperature, the heat capacity of the evaporator 18 can be utilized and restart the compressor 10 while there still remains some temperature difference between the evaporator surface and the air (outside air) blown over it.

As a result, the heating capacity does not fall due to compressor 10 being stopped for too long a time period. And thus in on/off-control of the compressor 10 it is possible to control the heating capacity well while preventing reduced life of the electromagnetic clutch 11.

Figure 4:
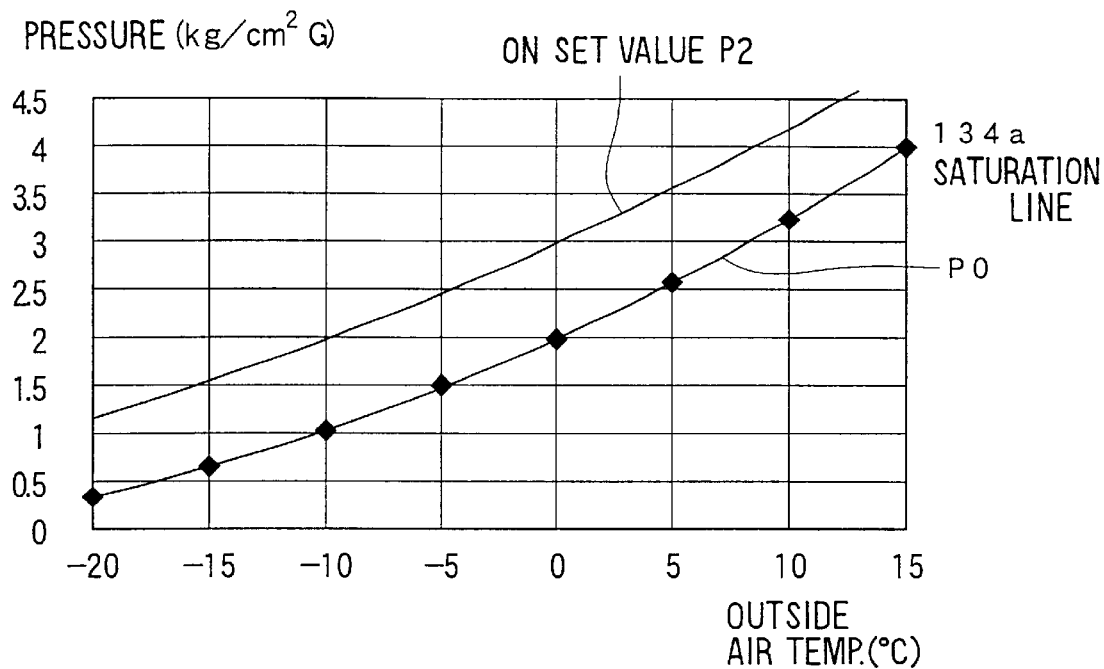
FIG. 4 is a graphical view of a refrigerant saturation chart for a first embodiment of a refrigerating cycle apparatus according to the present invention.

While the compressor is stopped, heat transfer increases from the high-pressure refrigerant to the outside air as the outside air temperature lowers. The high-side pressure Pd also falls with this increased heat transfer. However, as shown in FIG. 4, because the ON-set value P2 falls with the outside air temperature, the time compressor 10 is stopped is prevented from becoming short when the outside air temperature is low. Thus, by using a method for determining the ON-set value P2 based on FIG. 4, the time compressor 10 is stopped is substantially constant, irrespective of changes in the outside air temperature.

Figure 7:
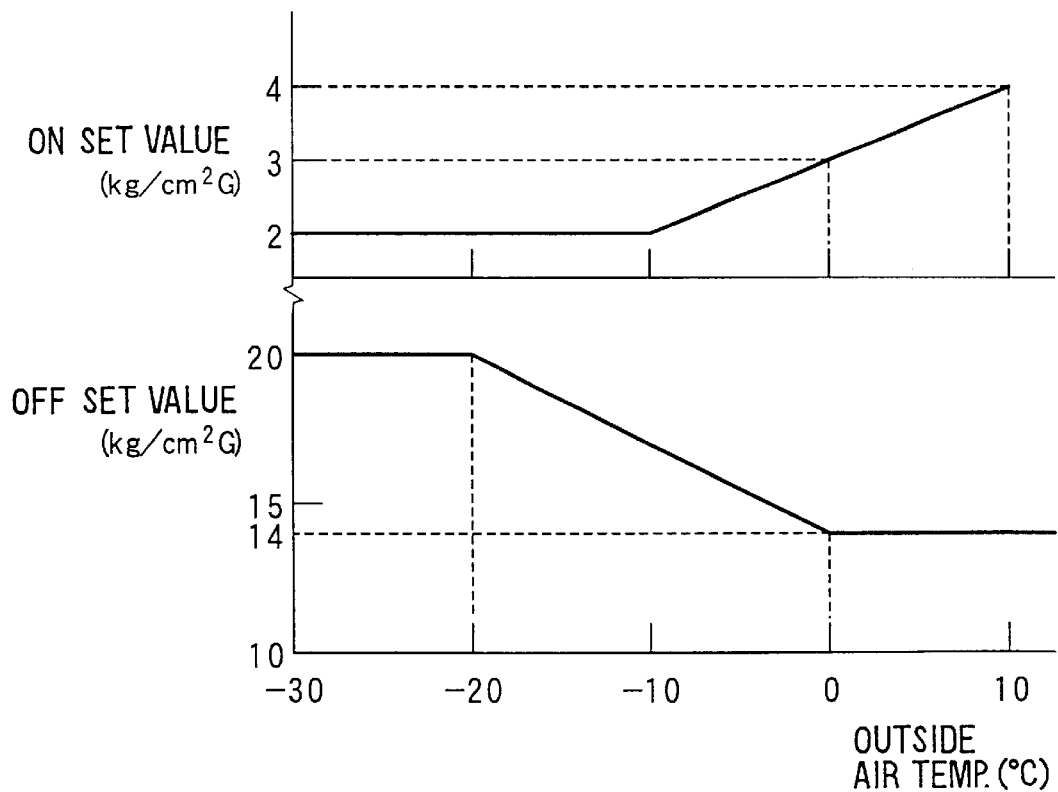
FIG. 7 is a graphical view showing ON-set values and Off-set values for a second embodiment of a refrigerating cycle apparatus according to the present invention.

FIG. 7 illustrates a second preferred embodiment of the present invention, showing another example of a method for determining the Off-set value P1 and the ON-set value P2 in steps S120 and S130 of FIG. 3. At low outside air temperatures (outside air temperature ≦0° C.), the ON-set value P2 is fixed at a constant value (for example 2 kg/cm²G). When the outside air temperature rises above 0° C., the ON-set value P2 rises proportional with the outside air temperature. Accordingly, the time compressor 10 is stopped is shortened, even though the high-side pressure Pd takes a long time to fall because the outside air temperature is over 0° C.

Moreover, in this embodiment, the OFF-set value P1 changes corresponding to the outside air temperature. That is, since as the outside air temperature increases, the heating load decreases and the required heating capacity decreases. In view of this, the OFF-set value P1 is lowered from 20 kg/cm²G to 14 kg/cm²G as the outside air temperature rises (−20° C.→0° C.). As a result, a heating capacity commensurate with the heating load can be appropriately set, and power is saved by reducing the compressor driving power as the outside air temperature rises.

Figure 8:
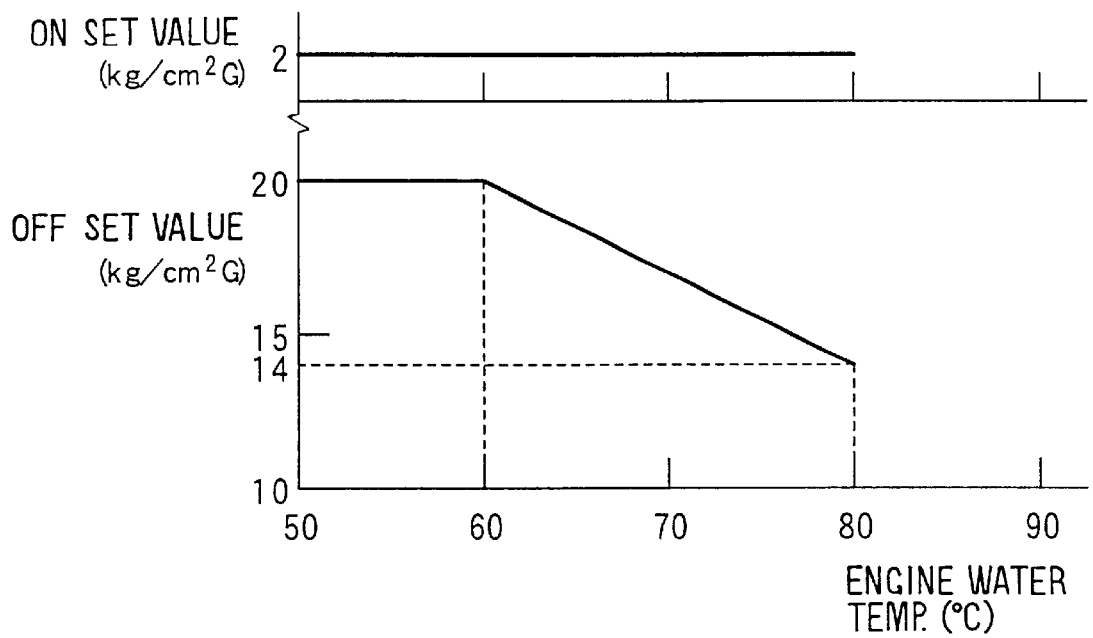
FIG. 8 is a graphical view showing ON-set values and Off-set values for a third embodiment of a refrigerating cycle apparatus according to the present invention.

FIG. 8 illustrates a third preferred embodiment of the present invention, wherein the OFF-set value P1 is made to fall as the engine water temperature rises. By this means, as in the second preferred embodiment, it is possible to achieve suitable control of heating capacity and save power.

Because the ON-set value P2 is fixed at a constant value (for example 2 kg/cm²G), in this embodiment, the outside air temperature determination value of step S140 in FIG. 3 is made 0° C. and hot gas heating mode operation is only carried out at low outside air temperatures (outside air temperature ≦0° C.). Accordingly, it is possible to avoid the problem of the compressor stopping time becoming excessively long and impossibility of restarting compressor.

Figure 9:
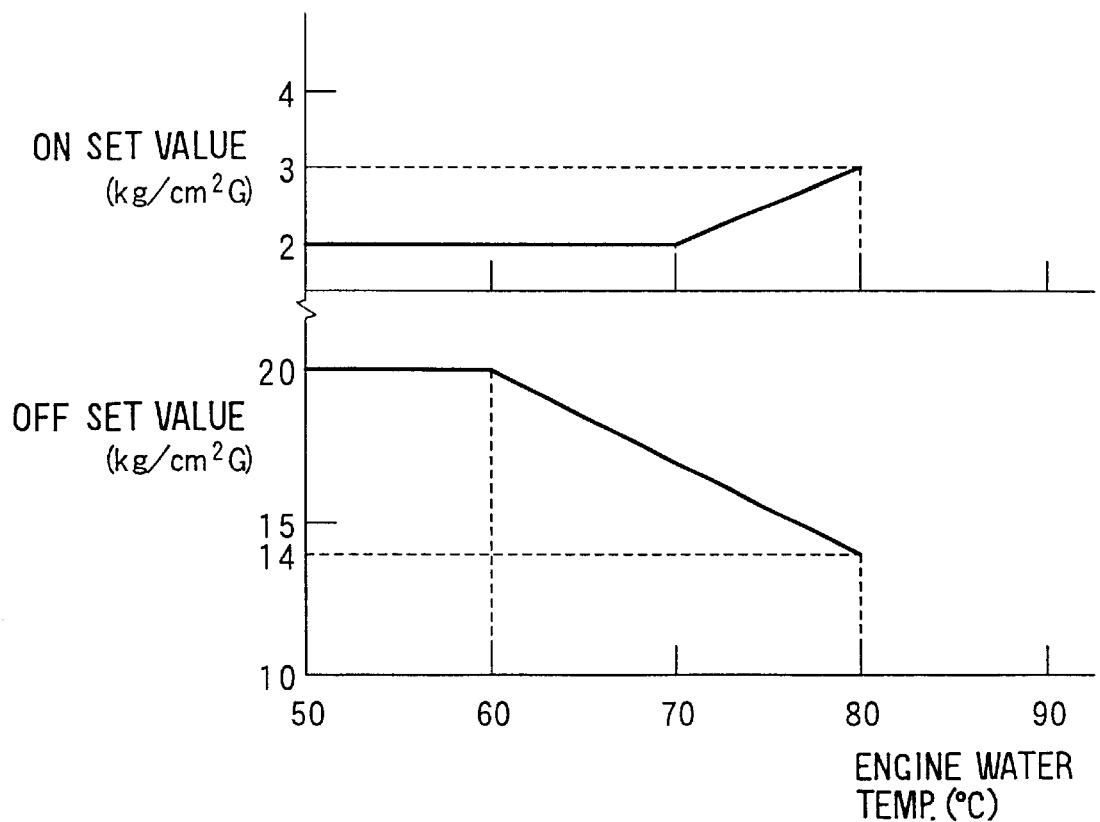
FIG. 9 is a graphical view showing ON-set values and Off-set values for a forth embodiment of a refrigerating cycle apparatus according to the present invention.

A fourth preferred embodiment is shown in FIG. 9. Here, a modified version of the third preferred embodiment, wherein the ON-set-value P2 is also made to change with the engine water temperature. That is, because the high-pressure piping parts of the cycle are disposed in the engine compartment, when the engine water temperature rises, the rate heat is released from the high-pressure refrigerant while the compressor is stopped decreases. As a result, it takes a longer time for the high-side pressure Pd to fall. So, in view of this, in fourth first preferred embodiment, increasing the amount of time compressor 10 is stopped is suppressed by making the ON-set value P2 rise with rising engine water temperature.

Figure 10:
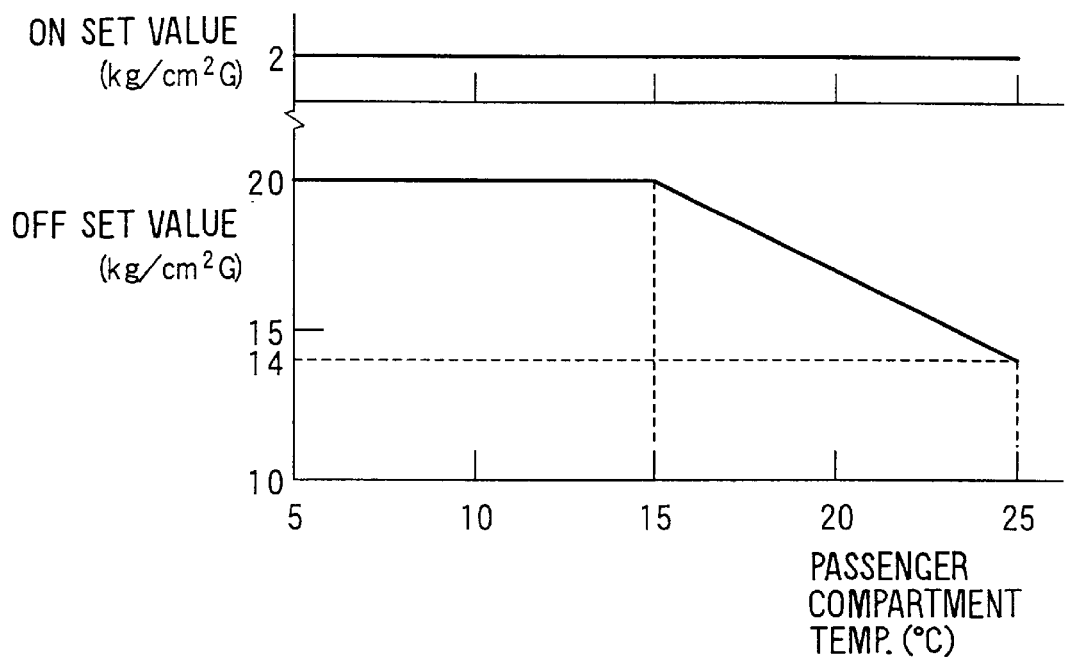
FIG. 10 is a graphical view showing ON-set values and Off-set values for a fifth embodiment of a refrigerating cycle apparatus according to the present invention.

FIG. 10 illustrates a fifth preferred embodiment. Here, a passenger compartment temperature (inside air temperature) is used instead of the engine water temperature (FIG. 8). As such, the OFF-set value P1 falls with temperature rises in the passenger compartment. As a result, the heating capacity, after the passenger compartment temperature has risen, is suppressed. Therefore, power is saved by reducing the compressor drive power.

Figure 11:
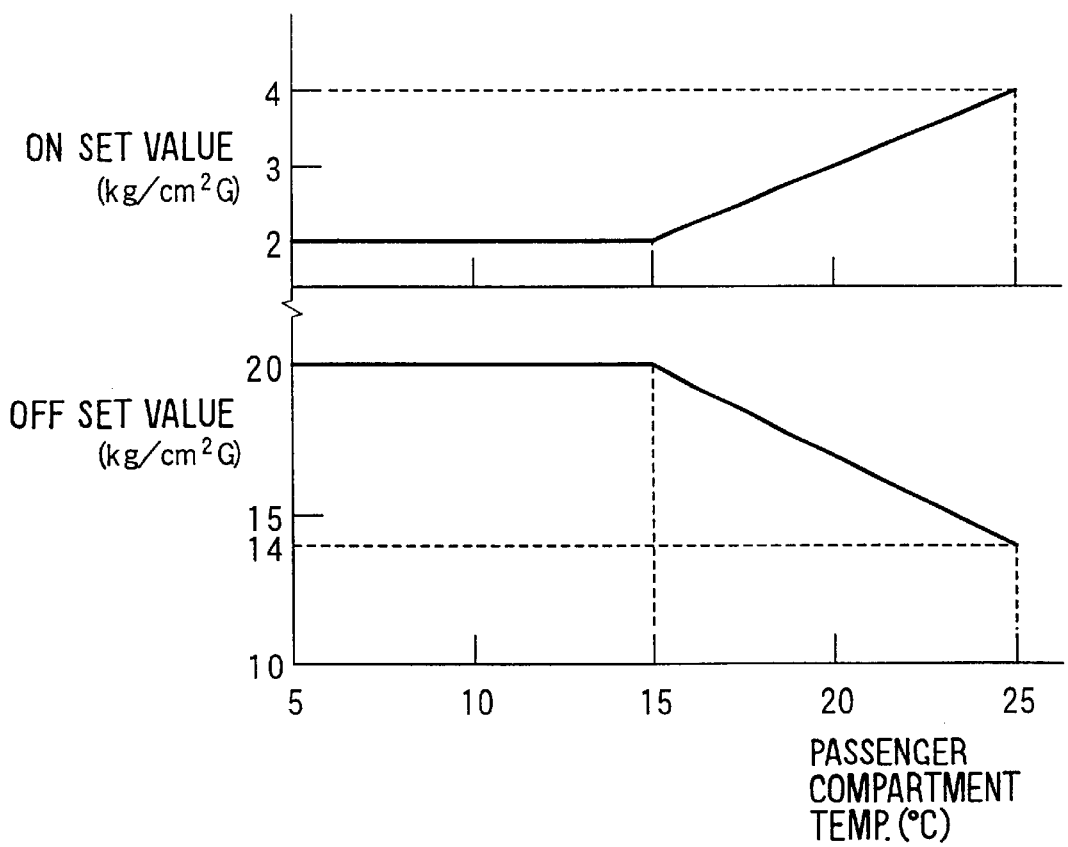
FIG. 11 is a graphical view showing ON-set values and Off-set values for a sixth embodiment of a refrigerating cycle apparatus according to the present invention.

FIG. 11 illustrates a sixth preferred embodiment of the present invention. Here, the passenger compartment temperature (inside air temperature) is used instead of the outside air temperature. Therefore, the Off-set value P1 is made to fall and the ON-set value P2 is made to rise with rise in the passenger compartment temperature.

Figure 12:
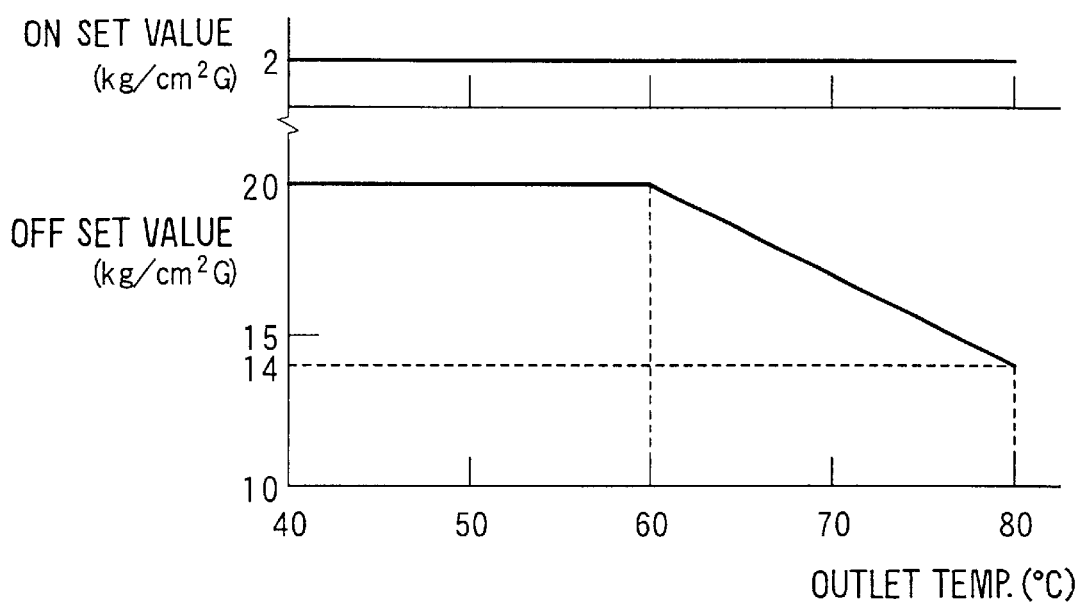
FIG. 12 is a graphical view showing ON-set values and Off-set values for a seventh embodiment of a refrigerating cycle apparatus according to the present invention.

FIG. 12 illustrates a seventh preferred embodiment of the present invention. Here, the outlet temperature of air blown into the passenger compartment through the outlets, downstream of the heat exchanger 24 for heating, are used. The, OFF-set value P1 is made to fall as the outlet temperature rises.

Figure 13:
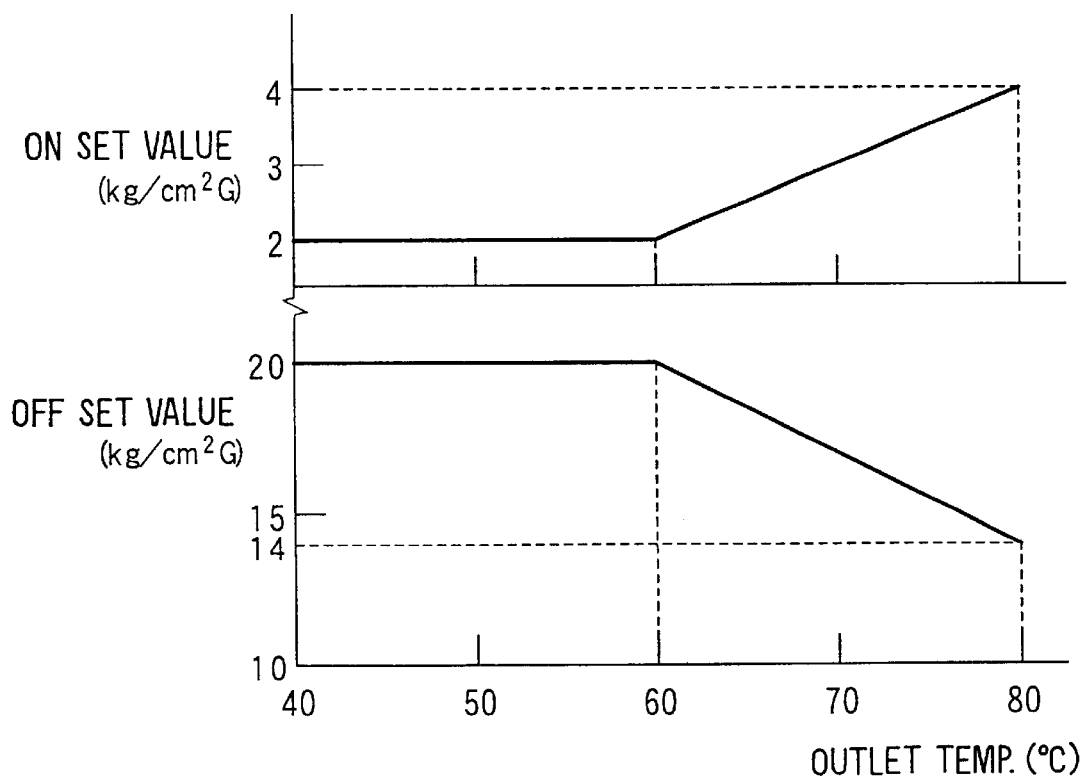
FIG. 13 is a graphical view showing ON-set values and Off-set values for a eighth embodiment of a refrigerating cycle apparatus according to the present invention.

FIG. 13 illustrates an eighth preferred embodiment of the present invention. The eighth embodiment is similar to the seventh preferred embodiment. However, in this embodiment, when the outlet temperature rises, the Off-set value P1 is made to fall and the ON-set value P2 is made to rise.

Thus, the Off-set value P1 and the ON-set value P2 can be determined based on various different conditions. Since the above-mentioned outside air temperature, engine water temperature, passenger compartment temperature (inside air temperature) and outlet temperature to the passenger compartment all correlate directly with the heating load, they are referred to in this invention as a physical quantity relating to the heating load. Since the OFF-set value P1 and the ON-set value P2 are corrected corresponding to this physical quantity, the heating capacity control can be well carried out by on/off-control of the compressor 10.

Besides the above mentioned physical quantities, it is also possible to use the airflow through the evaporator 18 as the physical quantity relating to the heating load. For example, the Off-set value P1 may be made to fall as this airflow decreases (as the heating load decreases).

Figure 14:
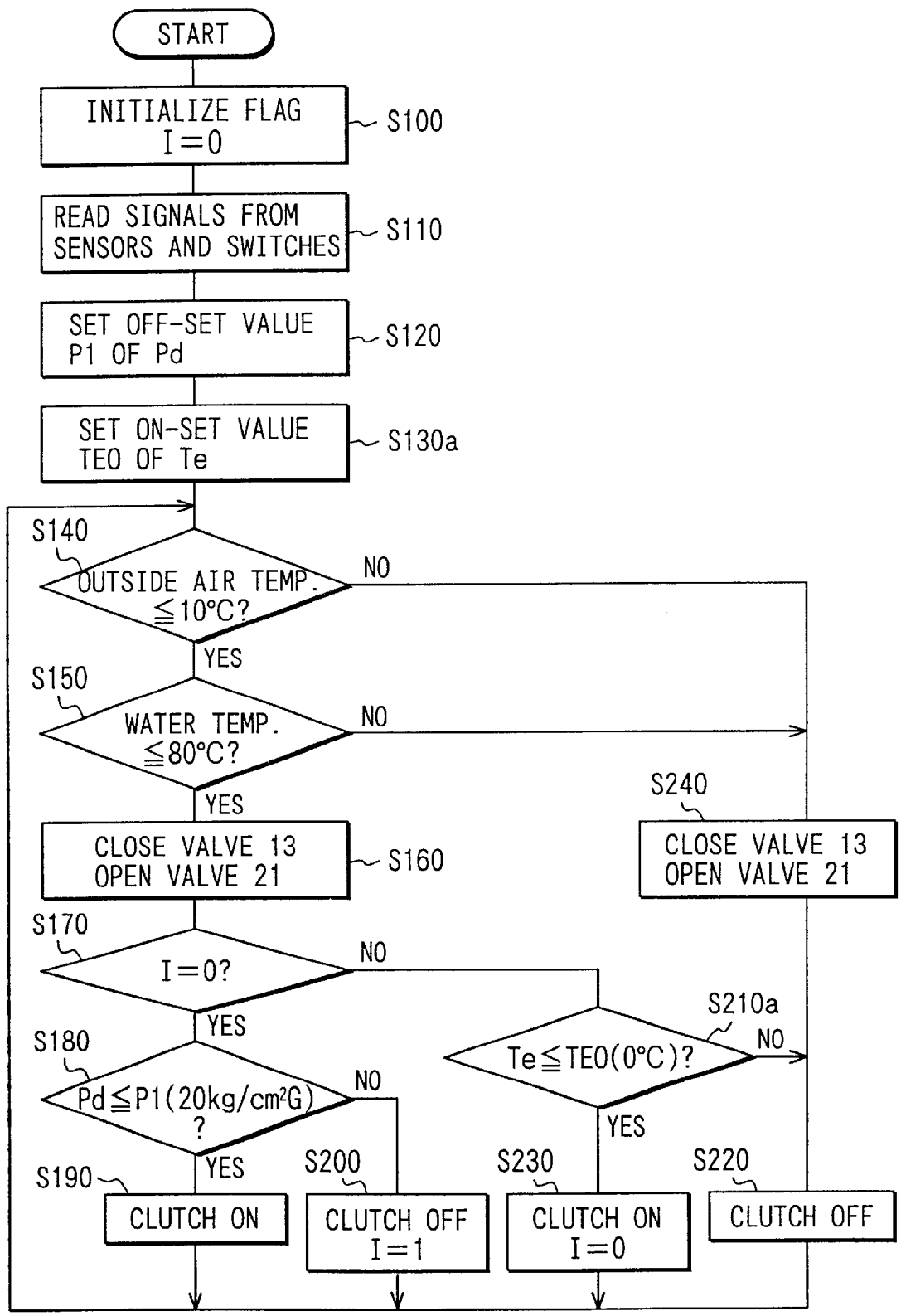
FIG. 14 is a flow chart illustrating a heating mode control for a ninth embodiment of a, refrigerating cycle apparatus according to the present invention.

FIG. 14 illustrates a ninth preferred embodiment of the present invention. In all of the first through eighth preferred embodiments described above the compressor 10 is restarted based on the high-side pressure Pd falling to an ON-set value P2. In the present embodiment, the compressor 10 is restarted based on the determination that the temperature Te of the evaporator 18 has fallen.

That is, since the heating capacity in the hot gas bypass heating mode is proportional to the temperature difference between the temperature Te of the evaporator 18 and the delivered air (outside air) temperature, the temperature Te of the evaporator 18 is a physical quantity relating to the heating capacity. Accordingly, the compressor 10 may be restarted when a fall in temperature Te of the evaporator 18 is determined.

In FIG. 14, step S130a corresponds to step S130 of FIG. 3. Here, s130a determines an ON-set value TEO of the temperature Te of the evaporator 18. This ON-set value TEO is also a set value at which indicates that there is no heating capacity, and in this example it is 0° C.

Step S210a corresponds to step S210 of FIG. 3. Here, s210a determines whether the actual evaporator temperature Te, detected by the evaporator temperature sensor 33, is below the ON-set value TEO. When this determination is YES, processing proceeds to step S230 and restarts the compressor 10. In other respects, the same operation as in FIG. 3 is carried out.

The evaporator temperature Te in this ninth preferred embodiment does not have to be the outlet air temperature of the evaporator 18. Instead, it may alternatively be detected, for example, as a fin surface temperature of the evaporator 18 or as a refrigerant pipe surface temperature of the evaporator 18.

In this embodiment, the ON-set value TEO of the evaporator temperature Te is fixed at a constant value (for example 0° C.) which is approximately the outside air temperature, However, this ON-set value TEO may alternatively be corrected so that it rises and falls in correspondence with rising and falling of a physical quantity representing the heating load such as the outside air temperature.

Figure 15:
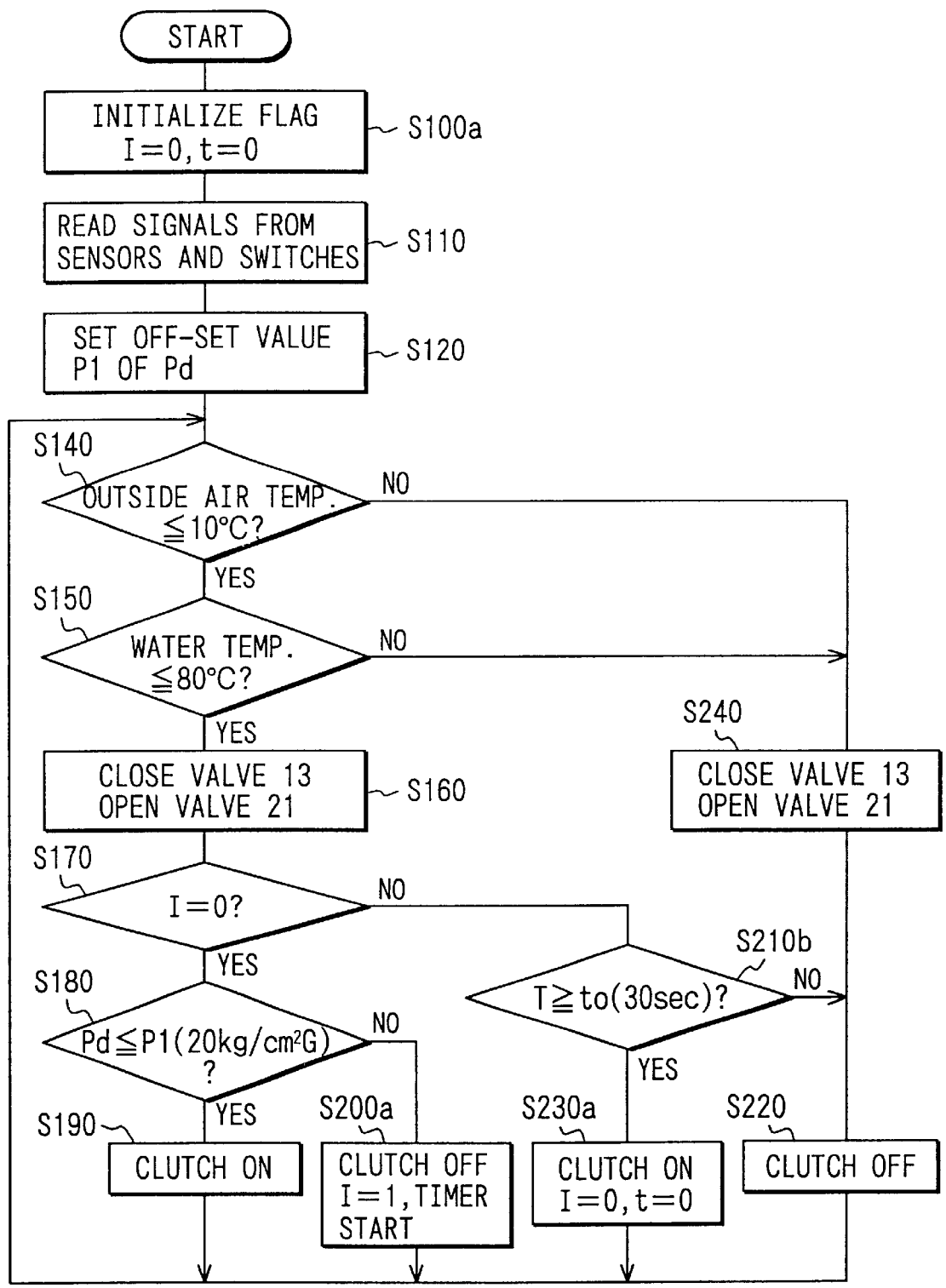
FIG. 15 is a flow chart illustrating a heating mode control for a tenth embodiment of a refrigerating cycle apparatus according to the present invention.

FIG. 15 illustrates a tenth preferred embodiment of the present invention. Here, the time compressor 10 is stopped is determined and the compressor 10 is restarted when this stopped time reaches a set time.

That is, in the tenth preferred embodiment, in a step S100a of FIG. 15, a timer time t is initialized to t=0. When, in step S200a, the compressor 10 is stopped, a timer is started and counting of the timer time t is begun. In step S210b it is determined whether the timer time t has reached a set time t0 (in this example, 30 seconds). Until the timer time t reaches the set time t0, processing proceeds to step S220 and continues keeping compressor 10 stopped.

When the timer time t reaches the set time t0, processing proceeds to step S230a and restarts the compressor 10. The flag I is updated to 0 and the timer time t is also updated to 0. In other respects, this preferred embodiment is the same as in FIG. 3 and FIG. 14.

Of course, in this embodiment, instead of the set time t0 being fixed at a constant value, the set time t0 may be corrected to increase and decrease with rising and falling physical quantity representing the heating load, such as the outside air temperature.

An issue addressed by an eleventh preferred embodiment will now be described. In the first through tenth embodiments described above, the hot gas bypass heating capacity is controlled by on/off-control of the compressor 10. However, in the hot gas bypass heating mode, the torque of compressor 10 reaches a high level of about 2 kgm when the compressor is stopped.

Figure 16:
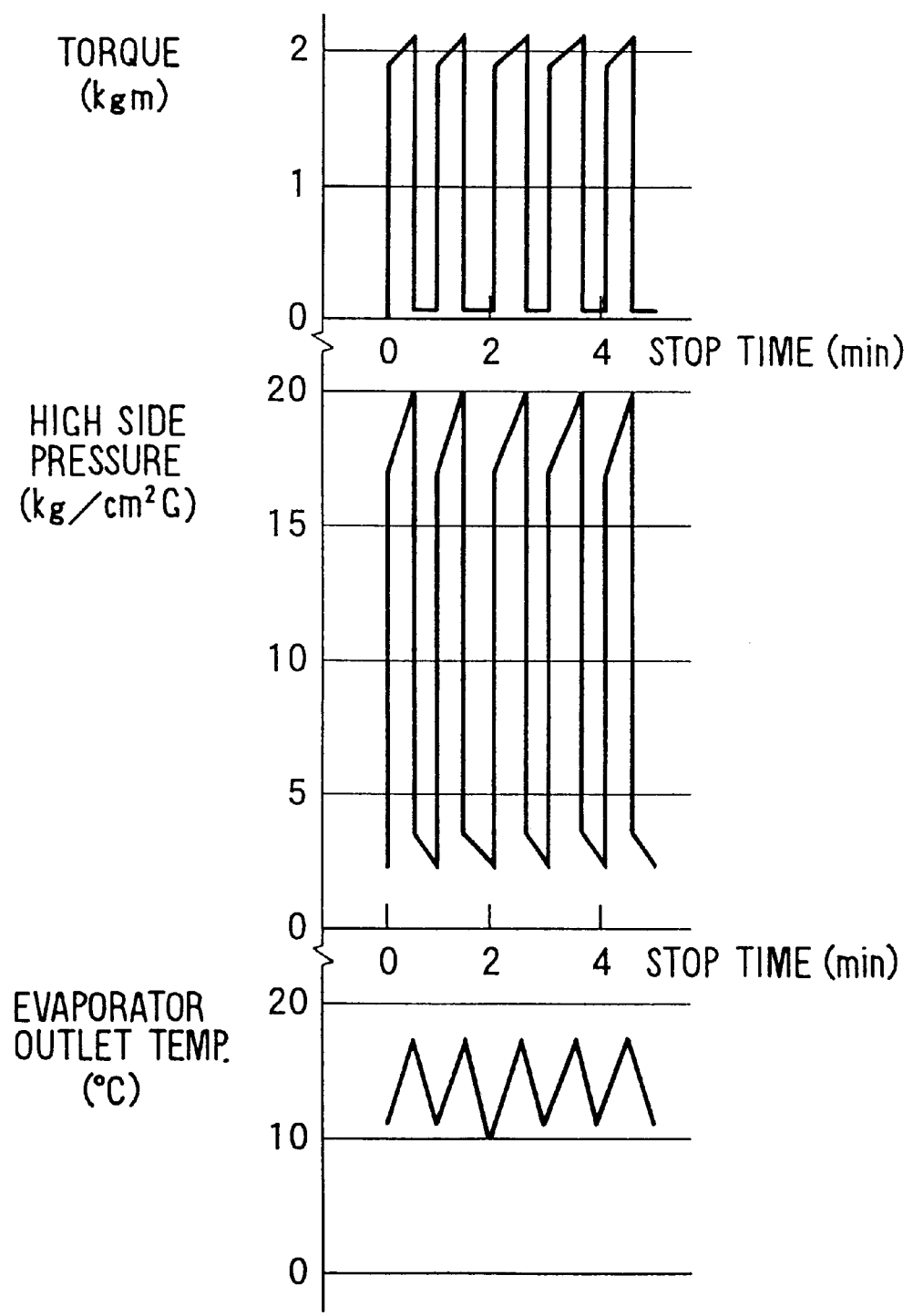
FIG. 16 is a graphical view of the heating mode for a first embodiment of a refrigerating cycle apparatus according to the present invention.

This will be explained more specifically with reference to FIG. 16. FIG. 16 illustrates the on/off-control carried out as in the first preferred embodiment. As such, when the high-side pressure Pd reaches an Off-set value Pi (20 kg/cm$^2$G), the compressor 10 is stopped. When, the high-side pressure Pd falls to an ON-set value P2 (2 kg/cm$^2$G), due to the compressor 10 being stopped, the compressor 10 is restarted. FIG. 16 also shows the behavior of the drive torque of the compressor 10, the high-side pressure, and the outlet air temperature of the evaporator 18. The experimental conditions for FIG. 16 were: outside air temperature=−5° C., blower flow 23=150 m$^3$/h, speed of compressor 10=1500 rpm, capacity of compressor 10=170 cc.

As shown in FIG. 16, the drive torque of the compressor 10 when stopped exceeds 2 kgm. Here, the maximum value of the drive torque (just over 2 kgm) is a high level, equivalent to compressor torque during midsummer cooldown (full-power operation at the start of cooling). During cooldown in the cooling mode, because the compressor 10 continues to operate, the compressor 10 cannot be stopped and restarted with the drive torque at a high level.

When the cooling mode reaches a steady state, the compressor 10 is switched on and off for cooling capacity control. For example, when the outlet air temperature of the evaporator 18 is below 3° C. the compressor 10 is switched OFF and when the outlet air temperature of the evaporator 18 is above 4° C. the compressor 10 is switched ON. When the cooling mode is in this steady state condition, the drive torque of the compressor 10 falls to about 1 kgm due to the cooling load falling. Therefore, the shock caused by stopping and starting of the compressor 10 has a relatively small effect on vehicle drivability.

However, in the hot gas bypass heating mode, torque fluctuations, twice those experienced during cooling mode steady state conditions, occurs along with capacity control. Therefore, the shock caused by stopping and starting of the compressor 10 is large and has an adverse effect on vehicle driveability.

In view of the above discussion, the eleventh preferred embodiment of the present invention provides a hot gas bypass heating capacity controlled well by switching refrigerant passages. Specifically, the electromagnetic valve for cooling 13 and the electromagnetic valve for heating 21 are switched, without stopping and starting the compressor 10.

Figure 17:
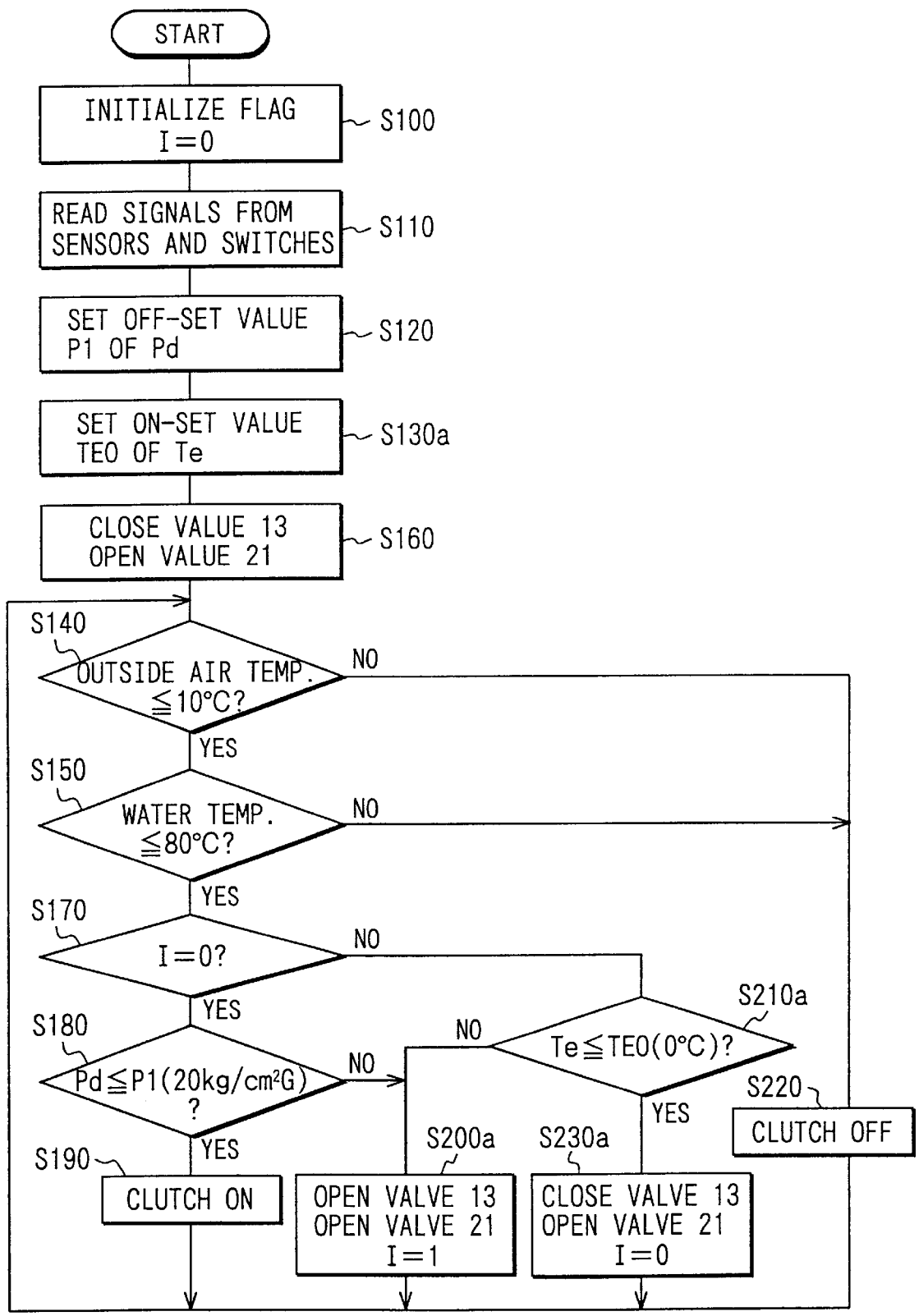
FIG. 17 is a graphical view showing heating mode control for a eleventh embodiment of a refrigerating cycle apparatus according to the present invention.

The eleventh preferred embodiment of the present invention is similar to that described for FIG. 1 and FIG. 2. However, with reference to FIG. 14 and FIG. 17, the heating mode control is different. In a step S160, provided after step S130a, the electromagnetic valve for cooling 13 is closed and the electromagnetic valve for heating 21 is opened. Thereby, the hot gas bypass heating mode is set.

Whereas in step S200 of FIG. 14, the electromagnetic clutch 11 is disengaged (turned OFF) to stop the compressor 10. In the eleventh preferred embodiment, in step S200a, corresponding to step S200, the electromagnetic valve for cooling 13 and the electromagnetic valve for heating 21 are both opened and the compressor 10 is not stopped. That is, in the eleventh preferred embodiment, when the high-side pressure Pd reaches the Off-set value P1 (for example 20 kg/cm$^2$G), processing proceeds from step S180 to step S200a and opens both electromagnetic valves 13, 21.

As a result, refrigerant delivered by the compressor 10 passes through the electromagnetic valve for cooling 13 and flows to the condenser 14 side. Because the refrigerant delivered by compressor 10 is amply cooled by low-temperature outside air in condenser 14, the high-side pressure Pd falls greatly even though the compressor 10 is still operating.

As the electromagnetic valves 13, 21 remain open and the high-side pressure Pd falls, the low-side pressure also falls. When the outlet temperature Te of the evaporator 18 consequently falls to the ON-set value TEO (for example 0° C.), processing proceeds from step S210a to step S230a and closes the electromagnetic valve for cooling 13 again. Consequently, all the refrigerant delivered by the compressor 10 passes through the electromagnetic valve 21 and the hot gas bypass conduit 20 and flows directly into the evaporator 18.

Consequently, because as the high-side pressure Pd rises, superheated gas refrigerant again flows into the evaporator 18. As a result, the outlet temperature Te of the evaporator 18 rises. Thus, in the eleventh embodiment, the heating capacity is controlled by a heating state wherein the electromagnetic valve for cooling 13 is closed and the electromagnetic valve for heating 21 is opened and a heating-suppressed state wherein the electromagnetic valves 13, 21 are both open being alternately repeated.

Figure 18:
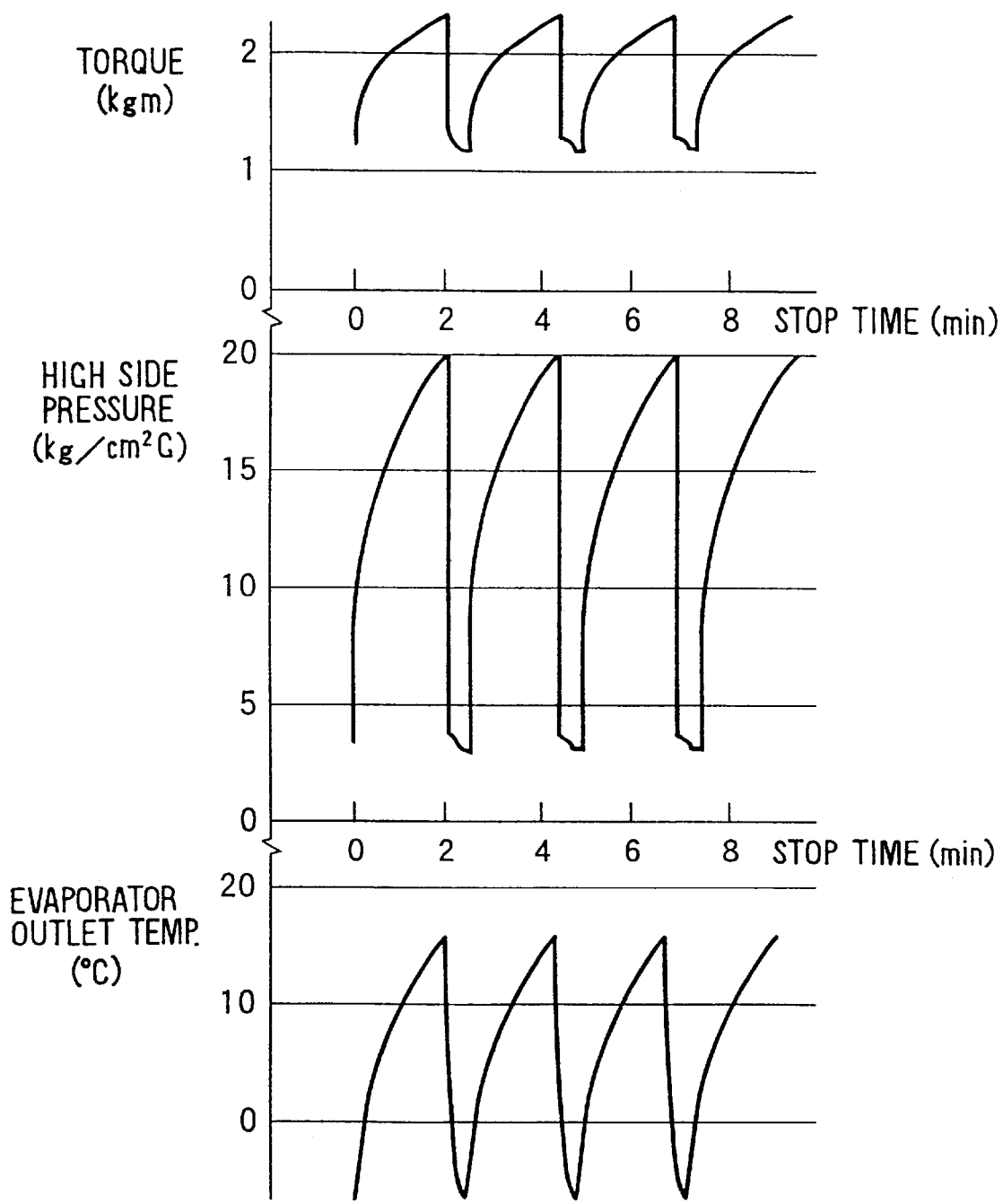
FIG. 18 is an operating characteristic chart for a eleventh embodiment of a refrigerating cycle apparatus according to the present invention.

As a result, the compressor 10 remains operating, not switched on and off. Therefore, the amplitude of the drive torque fluctuations of compressor 10 become approximately 1 kgm, as shown in FIG. 18. This is half of that described in FIG. 16. Therefore, the adverse effects on vehicle drivability are reduced and the vehicle drivability is improved.

The experimental conditions for FIG. 18 were the same as for FIG. 16, and the conditions for opening and closing the electromagnetic valve for cooling 13 were the same as those of the eleventh preferred embodiment described above.

In the eleventh preferred embodiment, in the heating-suppressed state wherein the electromagnetic valves 13, 21 are both open, the low-side pressure Ps falls further than described for FIG. 16 as the high-side pressure Pd falls. This is because compressor 10 is still operating. Consequently, even when the outlet temperature Te of the evaporator 18 falls to the ON-set value TEO and the heating state is resumed, the time required for the high-side pressure Pd to rise to the Off-set value P1 after such resumption becomes long (as shown in FIG. 18). Therefore, in the eleventh preferred embodiment the time period for the high-side pressure Pd to rise and fall is longer than described for FIG. 16.

In the eleventh preferred embodiment, although the amplitude of the fluctuations of the drive torque of the compressor 10 decreases, the degree by which the evaporator outlet temperature Te falls increases, as shown in FIG. 18. This fall is due to the fall of the low-side pressure Ps during the heating-suppressed state. The amplitude of the fluctuations of the evaporator outlet temperature Te increases more than in the embodiment of FIG. 16. However, because the delivered air passes through and is heated by the warm water type heat exchanger 24, the amplitude of fluctuation of the temperature of the delivered air is reduced to about 5° C. Furthermore, in the heating mode air is blown through foot outlets toward the feet of passengers. Therefore, fluctuation of the outlet temperature is not readily detected by passengers. Consequently, this increase in the amplitude of fluctuation of the evaporator outlet temperature Te is not, in practice, a problem.

Figure 19:
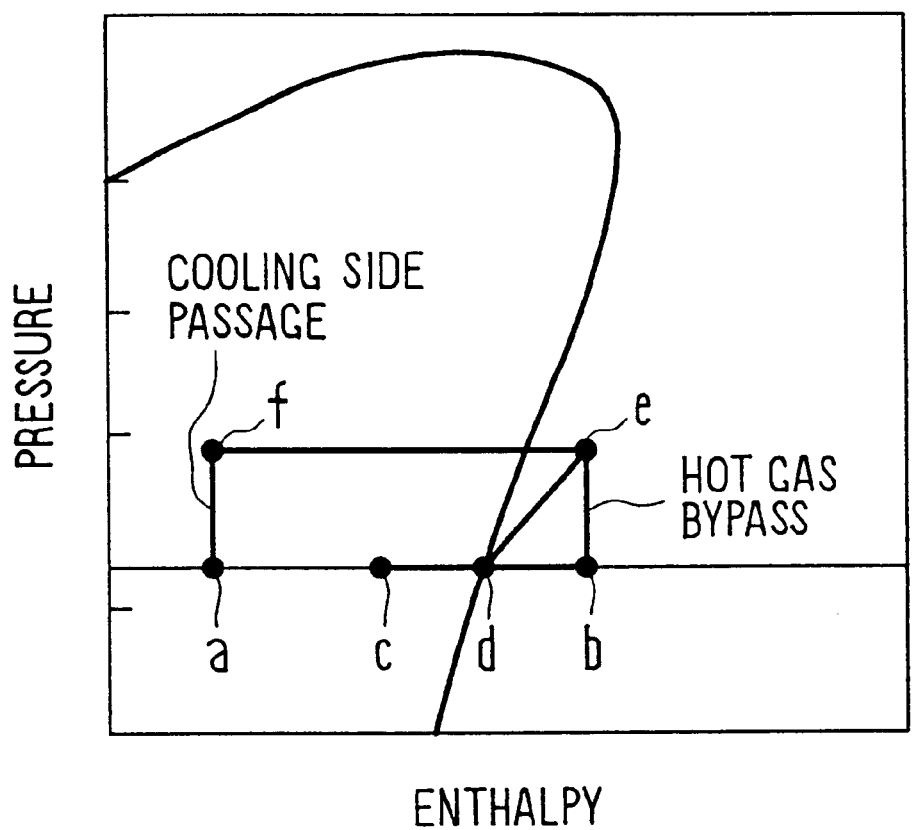
FIG. 19 is Mollier chart illustrating the operation of the heating mode for a eleventh embodiment of a refrigerating cycle apparatus according to the present invention.

FIG. 19 is a Mollier chart for the heating-suppressed state, wherein the electromagnetic valves 13 and 21 are both open. When the high-side pressure Pd and the evaporator outlet temperature Te of FIG. 18 have fallen the farthest, point a of FIG. 19 shows the state of refrigerant at the exit of temperature-controlled expansion valve 16 of FIG. 1. Likewise, point b shows the state of refrigerant at the exit of the throttle 21a of FIG. 1.

Refrigerant at the inlet of the evaporator 18 is a mixture of refrigerant at point a from the cooling side passage and point b refrigerant from the hot gas bypass side. This mixture assumes the state of point c, i.e. a gas/liquid two-phase state. Accordingly, in the evaporator 18, gas/liquid two-phase refrigerant absorbs heat from the delivered air and evaporates. Point d shows the state of refrigerant in the accumulator 19, point e shows the state of refrigerant at the discharge side of the compressor 10, and point f shows the state of refrigerant at the exit of the liquid-receiver 15. In the hot gas bypass heating mode, because refrigerant the condenser side and the liquid-receiver 15 moves to the evaporator and the accumulator side, refrigerant at the exit of the liquid-receiver assumes a gas/liquid two-phase state, as shown in FIG. 19.

Figure 20:
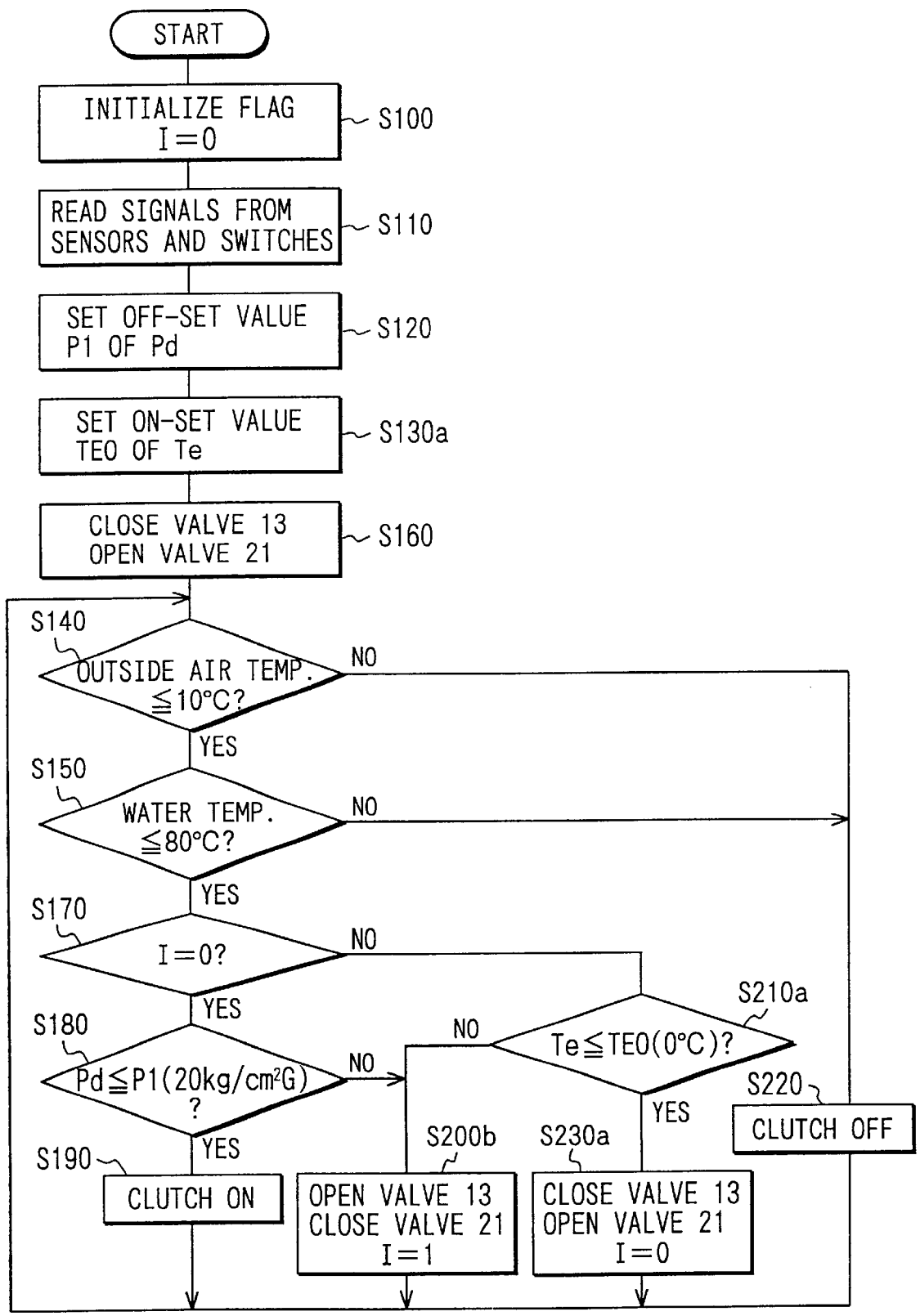
FIG. 20 is a flow chart illustrating heating mode control for a twelfth embodiment of a refrigerating cycle apparatus according to the present invention.

FIG. 20 illustrates a twelfth preferred embodiment of the present invention. This embodiment partly modifies the eleventh preferred embodiment described above. In the eleventh preferred embodiment, when the high-side pressure Pd rises above the Off-set value P1, processing proceeds from step S180 to step S200a and opens both of the electromagnetic valves 13 and 21 to set a heating-suppressed state. However, in the twelfth preferred, embodiment processing proceeds from step S180 to a step S200b and opens the electromagnetic valve 13 for cooling but closes the electromagnetic valve 21 for heating 21 to set a heating-suppressed state. That is, in the heating-suppressed state, the electromagnetic valves 13, 21 are brought to the same state as in the cooling mode.

Consequently, in the twelfth preferred embodiment, because in the heating-suppressed state the temperature of the evaporator outlet Te falls much faster than in the eleventh preferred embodiment, the rise and fall period of the high-side pressure Pd is shorter than in the eleventh preferred embodiment.

[1] In the first through eighth preferred embodiments, the compressor 10 was restarted based on the determination that the high-side pressure Pd had fallen to an ON-set value P2 after the compressor had stopped. However, because after the low-side pressure Ps has once risen due to the compressor 10 stopping it falls again toward the saturation pressure P0 with respect to the outside air temperature like the high-side pressure Pd. Therefore, as shown in FIG. 6, the compressor 10 may alternatively be restarted based on the determination that the low-side pressure Ps has fallen to a set value (that is, an ON-set value of the low-side pressure Ps).

[2] Because the high-side pressure Pd and the low-side pressure Ps respectively correlate directly with the high-pressure refrigerant temperature and the low-pressure refrigerant temperature, the high-pressure refrigerant temperature and the low-pressure refrigerant temperature may be detected as physical quantities representing the high-side pressure Pd and the low-side pressure Ps.

[3] Although in the circuit construction of the refrigerating cycle of FIG. 1 a liquid-receiver 15 and a temperature-controlled expansion valve 16 are combined in the cooling mode, a fixed throttle may be used in lieu of the liquid-receiver 15 and temperature-controlled expansion valve 16.

[4] In the refrigerating cycle of FIG. 1, the electromagnetic valves 13 and 21 for cooling and heating can be replaced with a single valve device, in which switching functions of a plurality of passages are integrated.

[5] Although a dedicated switch, manually operated by an occupant, is provided in an air-conditioning control panel 40 as the hot gas switch 41 in the embodiment of FIG. 2, switch 41 to be dispensed with and replaced by other switching means. For example, when a manual warm-up switch for idling the vehicle engine 12 is provided on the vehicle side, the hot gas bypass heating mode may be invoked based on this manual engine warm-up switch being thrown.

[6] wherein warming up vehicle engine 12 is carried out automatically based on the determination by an electronic engine control unit (not shown) that vehicle engine 12 warm-up conditions are satisfied, the hot gas bypass heating mode may be invoked automatically based on a warm-up signal in the electronic engine control unit.

[7] In the eleventh and twelfth preferred embodiments of the present invention, from the heating-suppressed state of the electromagnetic valves 13 and 21, the electromagnetic valves 13, 21 were restored to the heating state when it was determined that the evaporator temperature Te had fallen to an ON-set value TEO. However, the electromagnetic valves 13 and 21 alternatively may be restored to the heating mode state based on the determination the cycle refrigerant pressure has fallen or the like, instead of the evaporator temperature Te.

Alternatively, the tenth embodiment (FIG. 15) can be applied to the eleventh and twelfth embodiments, with the elapsed time of the heating-suppressed state being determined and the electromagnetic valves 13, 21 being restored to the heating mode state when the elapsed time of the heating-suppressed state reaches a set time.

While the above-described embodiments refer to examples of usage of the present invention, it is understood that the present invention may be applied to other usage, modifications and variations of the same, and is not limited to the disclosure provided herein.

What is claimed is:

1. A refrigerating cycle apparatus having a compressor, a condenser, a first pressure-reducing device and an evaporator, said refrigerating cycle apparatus comprising:

a hot gas bypass conduit directly connecting the discharge side of the compressor to the inlet side of the evaporator;

a second pressure-reducing device provided in the hot gas bypass conduit for reducing in pressure gas refrigerant delivered by the compressor, wherein said evaporator is heated and acts as a radiator when in a hot gas bypass heating mode, said radiator being heated by gas refrigerant from a discharge side of said compressor directly through said hot gas bypass conduit;

stop control means stopping the compressor when a physical quantity representing a high-side pressure at the compressor discharge side rises above a set value during said hot gas bypass heating mode; and operation restart control means for restarting the compressor while the compressor is stopped, said operation restart control means restarting said compressor when a physical quantity representing a heating capacity of the evaporator falls below a set value which indicates that there is no heating capacity.

2. A refrigerating cycle apparatus having a compressor, a condenser, a first pressure-reducing device, an evaporator, said refrigerating cycle device comprising:

a hot gas bypass conduit for directly connecting a discharge side of the compressor to the inlet side of the evaporator;

a second pressure-reducing device provided in the hot gas bypass conduit for reducing in pressure gas refrigerant delivered by the compressor;

a valve means for switching a connection between the discharge side of said compressor and the hot gas bypass conduit, said valve means switching a connection between the discharge side of the compressor and the condenser, wherein said evaporator generates heat and acts as a radiator from gas refrigerant provided by the discharge side of the compressor and directly through the hot gas bypass conduit when in a hot gas bypass heating mode;

first control means controlling the valve means such that refrigerant flows to a condenser side during hot gas bypass heating mode when physical quantity representing a high-side pressure at the compressor discharge side rises: above a set value; and second control means for restoring the valve means to a heating mode operation state when a physical quantity representing a heating capacity of the evaporator falls below a set value, said set value indicating that there is no heating capacity.

3. A refrigerating cycle apparatus according to claim 2, wherein the first control means controls the valve means such that the connection between the discharge side of the compressor and the hot gas bypass conduit is open, said first control means controls the valve means such that the connection between the discharge side of the compressor and the condenser is open.

4. A refrigerating cycle apparatus according to claim 2, wherein the first control means controls the valve means such that the connection between the discharge side of the compressor and the hot gas bypass conduit closes, said first control means controls the valve means such that the connection between the discharge side of the compressor and the condenser is open.

5. A refrigerating cycle apparatus according to claims 1, wherein of the set value pertaining to the physical quantity representing the high-side pressure or the set value pertaining to the physical quantity representing the heating capacity is corrected based on a physical quantity representing a heating load.

6. A refrigerating cycle apparatus according to claim 5, wherein the physical quantity representing a heating load is an outside air temperature or the temperature of a space being heated.

7. A refrigerating cycle apparatus according to claim 5, wherein a warm water type heat exchanger for heating constitutes a main heating device, said warm water type heat exchanger being disposed on an air downstream side of the evaporator, the physical quantity representing the heating load is the temperature of warm water circulating through the warm water type heat exchanger or an outlet temperature of air blown into a space through an outlet positioned downstream of the heat exchanger.

8. A refrigerating cycle apparatus according to claim 1, wherein the physical quantity representing the heating capacity is a refrigerant pressure in the cycle during a stoppage of the compressor.

9. A refrigerating cycle apparatus according to claim 1, wherein the physical quantity representing the heating capacity is a refrigerant pressure of a high side of said compressor when said compressor is stopped, said compressor being restarted when the refrigerant pressure falls to the vicinity of a saturation pressure corresponding to an outside air temperature.

10. A refrigerating cycle apparatus according to claim 1, wherein the physical quantity representing the heating capacity is a temperature of the evaporator.

11. A refrigerating cycle apparatus according to claim 1, wherein the physical quantity representing the heating capacity is a temperature of the evaporator, the compressor being restarted when the temperature of the evaporator falls to a temperature to about an outside air temperature, said temperature of said evaporator falling as a result of the compressor being stopped.

12. A refrigerating cycle apparatus having a compressor, a condenser, a first pressure-reducing device, an evaporator, said refrigerating cycle apparatus comprising:

a hot gas bypass conduit directly connecting the discharge side of the compressor to the inlet side of the evaporator;

a second pressure-reducing device provided in the hot gas bypass conduit for reducing in pressure gas refrigerant delivered by the compressor, wherein said evaporator is heated and acts as a radiator when in a hot gas bypass heating mode, said radiator being heated by gas refrigerant from a discharge side of said compressor directly through said hot gas bypass conduit;

stop control means stopping the compressor when a physical quantity representing a high-side pressure at a compressor discharge side rises above a set value during the hot gas bypass heating mode; and operation restart control means which restarts the compressor when a time which the compressor has been stopped reaches a set value.

13. A refrigerating cycle apparatus as claimed in claim 12, further comprising a refrigerant deficiency detecting means, said refrigerant deficiency detecting means comparing said physical quantity representing said high-side pressure with said set value, said refrigerant deficiency detecting means outputting a low refrigerant charge signal when said physical quantity representing said high-side pressure falls below said set value.

* * * * *